US012634781B2

(12) United States Patent
Hanif et al.

(10) Patent No.: US 12,634,781 B2
(45) Date of Patent: May 19, 2026

(54) BEAM FAILURE RECOVERY FOR SIDELINK CARRIER AGGREGATION

(71) Applicant: QUALCOMM Incorporated, San Diego, CA (US)

(72) Inventors: Ahmed Farhan Hanif, Versailles (FR); Jelena Damnjanovic, Del Mar, CA (US); Tao Luo, San Diego, CA (US); Sony Akkarakaran, Poway, CA (US)

(73) Assignee: QUALCOMM Incorporated, San Diego, CA (US)

( * ) Notice: Subject to any disclaimer, the term of this patent is extended or adjusted under 35 U.S.C. 154(b) by 623 days.

(21) Appl. No.: 17/823,888

(22) Filed: Aug. 31, 2022

(65) Prior Publication Data

US 2024/0073757 A1 Feb. 29, 2024

(51) Int. Cl.
*H04W 36/06* (2009.01)
*H04B 7/06* (2006.01)
(Continued)

(52) U.S. Cl.
CPC .......... *H04W 36/06* (2013.01); *H04B 7/0695* (2013.01); *H04B 7/06952* (2023.05);
(Continued)

(58) Field of Classification Search
CPC ..... H04W 36/06; H04W 76/18; H04W 76/14; H04W 72/04; H04W 8/22; H04W 76/19;
(Continued)

(56) References Cited

U.S. PATENT DOCUMENTS

2020/0351833 A1* 11/2020 Chae ................... H04W 52/383
2021/0051653 A1* 2/2021 Park ...................... H04W 72/21
(Continued)

FOREIGN PATENT DOCUMENTS

CN            113691358 A  * 11/2021  ............ H04W 72/21
WO     WO-2018049931 A1 *  3/2018   ........ H04W 56/0035
(Continued)

OTHER PUBLICATIONS

M. H. C. Garcia et al., "A Tutorial on 5G NR V2X Communications," in IEEE Communications Surveys & Tutorials, vol. 23, No. 3, pp. 1972-2026, thirdquarter 2021, doi: 10.1109/COMST.2021. 3057017. keywords: (Year: 2021).*
(Continued)

*Primary Examiner* — Phirin Sam
*Assistant Examiner* — Louis Samara
(74) *Attorney, Agent, or Firm* — Harrity & Harrity LLP/Qualcomm Incorporated

(57) ABSTRACT
Various aspects of the present disclosure generally relate to wireless communication. In some aspects, a user equipment (UE) may transmit reference signals on a primary sidelink carrier and on one or more secondary sidelink carriers using carrier aggregation. The UE may receive a medium access control element (MAC CE) that indicates a beam failure on the primary sidelink carrier, the one or more secondary sidelink carriers, or both. The UE may transmit, in response to receiving the MAC CE, an aperiodic reference signal on the primary sidelink carrier. Numerous other aspects are described.

40 Claims, 14 Drawing Sheets

(51) Int. Cl.
  *H04L 5/00* (2006.01)
  *H04W 76/18* (2018.01)
(52) U.S. Cl.
  CPC ............ *H04L 5/0048* (2013.01); *H04L 5/006*
    (2013.01); *H04L 5/0094* (2013.01); *H04W*
    *76/18* (2018.02)
(58) Field of Classification Search
  CPC . H04B 7/0695; H04B 7/06952; H04L 5/0048;
    H04L 5/006; H04L 5/0094; H04L 5/0037
  See application file for complete search history.

(56) References Cited

U.S. PATENT DOCUMENTS

| | | | | |
|---|---|---|---|---|
| 2021/0136856 | A1* | 5/2021 | Tseng | H04W 76/14 |
| 2021/0344460 | A1* | 11/2021 | Park | H04W 4/40 |
| 2022/0007227 | A1* | 1/2022 | Zhao | H04L 5/0037 |
| 2022/0046660 | A1* | 2/2022 | Huang | H04L 5/0037 |
| 2022/0150730 | A1* | 5/2022 | Freda | H04L 1/1812 |
| 2023/0084636 | A1* | 3/2023 | Hosseini | H04L 5/0048 |
| | | | | 370/329 |
| 2025/0055639 | A1* | 2/2025 | Guo | H04W 72/20 |

FOREIGN PATENT DOCUMENTS

| | | | | |
|---|---|---|---|---|
| WO | WO-2018228127 | A1 * | 12/2018 | ............ H04W 24/10 |
| WO | WO-2020167773 | A1 * | 8/2020 | ............ H04L 1/188 |
| WO | WO-2021037583 | A1 * | 3/2021 | ............ H04W 76/19 |
| WO | WO-2022036248 | A2 * | 2/2022 | ............ H04W 72/20 |
| WO | WO-2022141614 | A1 | 7/2022 | |
| WO | WO-2023199171 | A1 * | 10/2023 | ............ H04W 40/22 |

OTHER PUBLICATIONS

Partial International Search Report—PCT/US2023/071371—ISA/EPO—Nov. 15, 2023.
International Search Report and Written Opinion—PCT/US2023/071371—ISA/EPO—Jan. 9, 2024.

* cited by examiner

UE 620

UE 610

1005
Transmit BFD-RS sets
PCC BFD-RS set
SCC1 BFD-RS set
SCC2 BFD-RS set

1010
Detect beam failure on
SCC1

1015
Transmit MAC CE indicating beam failure
PCC

1020
Transmit aperiodic BFD-RSs
SCC1

1025
Transmit indication of viable beams on PCC or other SCCs

1030
Transmit switch message
PCC

1035
Switch SCC beams

1000

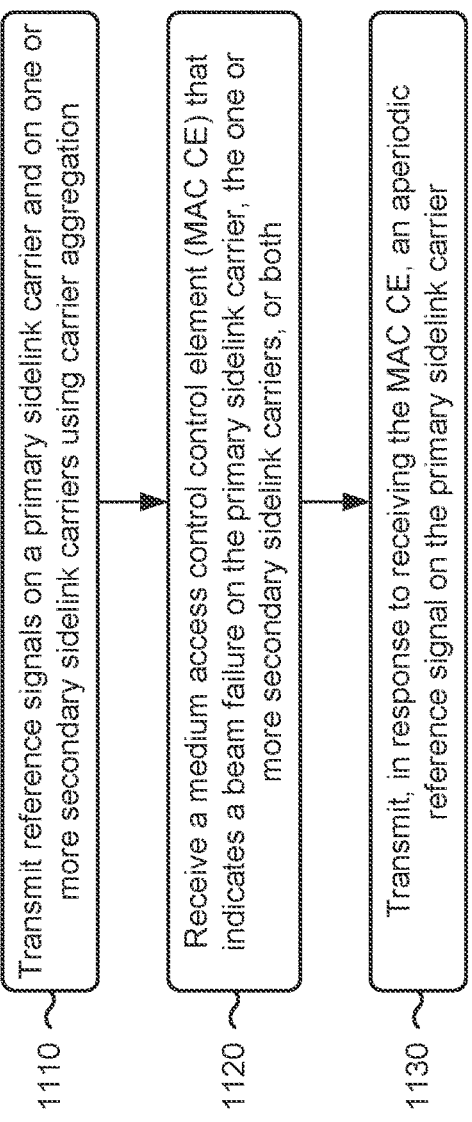

1110 Transmit reference signals on a primary sidelink carrier and on one or more secondary sidelink carriers using carrier aggregation 1120 Receive a medium access control control element (MAC CE) that indicates a beam failure on the primary sidelink carrier, the one or more secondary sidelink carriers, or both 1130 Transmit, in response to receiving the MAC CE, an aperiodic reference signal on the primary sidelink carrier

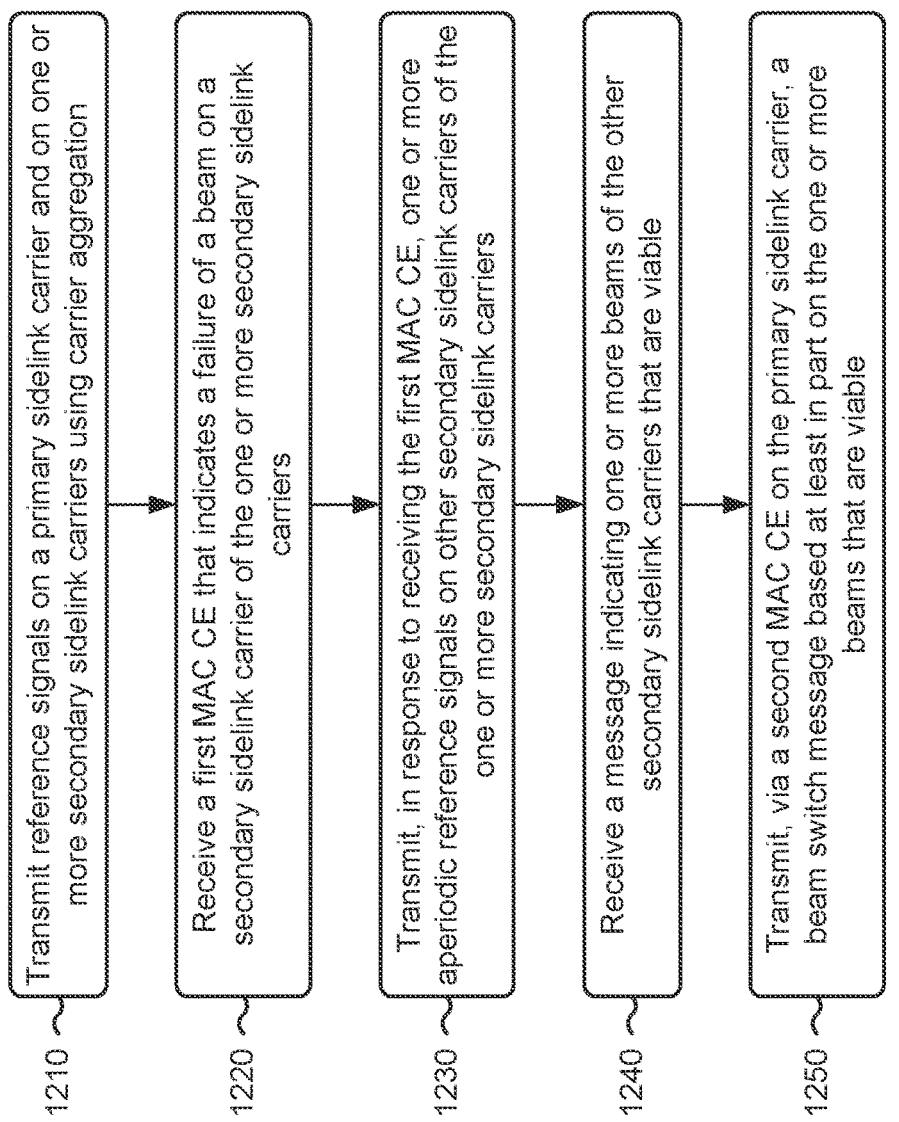

1210 — Transmit reference signals on a primary sidelink carrier and on one or more secondary sidelink carriers using carrier aggregation 1220 — Receive a first MAC CE that indicates a failure of a beam on a secondary sidelink carrier of the one or more secondary sidelink carriers 1230 — Transmit, in response to receiving the first MAC CE, one or more aperiodic reference signals on other secondary sidelink carriers of the one or more secondary sidelink carriers 1240 — Receive a message indicating one or more beams of the other secondary sidelink carriers that are viable 1250 — Transmit, via a second MAC CE on the primary sidelink carrier, a beam switch message based at least in part on the one or more beams that are viable

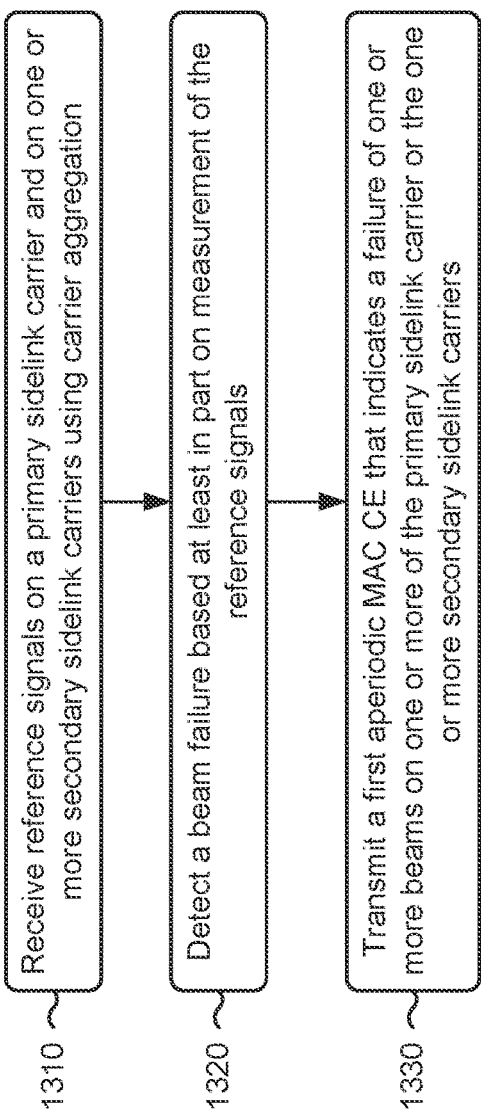

1310  Receive reference signals on a primary sidelink carrier and on one or more secondary sidelink carriers using carrier aggregation 1320  Detect a beam failure based at least in part on measurement of the reference signals 1330  Transmit a first aperiodic MAC CE that indicates a failure of one or more beams on one or more of the primary sidelink carrier or the one or more secondary sidelink carriers

BEAM FAILURE RECOVERY FOR SIDELINK CARRIER AGGREGATION

FIELD OF THE DISCLOSURE

Aspects of the present disclosure generally relate to wireless communication and to techniques and apparatuses for beam failure recovery for sidelink carrier aggregation.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more network nodes that support communication for wireless communication devices, such as a user equipment (UE) or multiple UEs. A UE may communicate with a network node via downlink communications and uplink communications. "Downlink" (or "DL") refers to a communication link from the network node to the UE, and "uplink" (or "UL") refers to a communication link from the UE to the network node. Some wireless networks may support device-to-device communication, such as via a local link (e.g., a sidelink (SL), a wireless local area network (WLAN) link, and/or a wireless personal area network (WPAN) link, among other examples).

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a user equipment (UE). The method may include transmitting reference signals on a primary sidelink carrier and on one or more secondary sidelink carriers using carrier aggregation. The method may include receiving a medium access control control element (MAC CE) that indicates a beam failure on the primary sidelink carrier, the one or more secondary sidelink carriers, or both. The method may include transmitting, in response to receiving the MAC CE, an aperiodic reference signal on the primary sidelink carrier.

Some aspects described herein relate to a method of wireless communication performed by a UE. The method may include transmitting reference signals on a primary sidelink carrier and on one or more secondary sidelink carriers using carrier aggregation. The method may include receiving a first MAC CE that indicates a failure of a beam on a secondary sidelink carrier of the one or more secondary sidelink carriers. The method may include transmitting, in response to receiving the first MAC CE, one or more aperiodic reference signals on other secondary sidelink carriers of the one or more secondary sidelink carriers. The method may include receiving a message indicating one or more beams of the other secondary sidelink carriers that are viable. The method may include transmitting, via a second MAC CE on the primary sidelink carrier, a beam switch message based at least in part on the one or more beams that are viable.

Some aspects described herein relate to a method of wireless communication performed by a UE. The method may include receiving reference signals on a primary sidelink carrier and on one or more secondary sidelink carriers using carrier aggregation. The method may include detecting a beam failure based at least in part on measurement of the reference signals. The method may include transmitting a first aperiodic MAC CE that indicates a failure of one or more beams on one or more of the primary sidelink carrier or the one or more secondary sidelink carriers.

Some aspects described herein relate to a UE for wireless communication. The UE may include a memory, a transceiver, and one or more processors coupled to the transceiver and the memory. The one or more processors may be configured to transmit, via the transceiver, reference signals on a primary sidelink carrier and on one or more secondary sidelink carriers using carrier aggregation. The one or more processors may be configured to receive, via the transceiver, a MAC CE that indicates a beam failure on the primary sidelink carrier, the one or more secondary sidelink carriers, or both. The one or more processors may be configured to transmit, via the transceiver and in response to receiving the MAC CE, an aperiodic reference signal on the primary sidelink carrier.

Some aspects described herein relate to a UE for wireless communication. The UE may include a memory, a transceiver, and one or more processors coupled to the transceiver and the memory. The one or more processors may be configured to transmit, via the transceiver, reference signals on a primary sidelink carrier and on one or more secondary sidelink carriers using carrier aggregation. The one or more processors may be configured to receive, via the transceiver, a first MAC CE that indicates a failure of a beam on a secondary sidelink carrier of the one or more secondary sidelink carriers. The one or more processors may be configured to transmit, via the transceiver and in response to receiving the first MAC CE, one or more aperiodic reference signals on other secondary sidelink carriers of the one or more secondary sidelink carriers. The one or more processors may be configured to receive, via the transceiver, a message indicating one or more beams of the other secondary sidelink carriers that are viable. The one or more processors may be configured to transmit, via the transceiver using a second MAC CE on the primary sidelink carrier, a beam switch message based at least in part on the one or more beams that are viable.

Some aspects described herein relate to a UE for wireless communication. The UE may include a memory, a transceiver, and one or more processors coupled to the transceiver and the memory. The one or more processors may be configured to receive, via the transceiver, reference signals on a primary sidelink carrier and on one or more secondary sidelink carriers using carrier aggregation. The one or more processors may be configured to detect a beam failure based at least in part on measurement of the reference signals. The one or more processors may be configured to transmit, via the transceiver, a first aperiodic MAC CE that indicates a failure of one or more beams on one or more of the primary sidelink carrier or the one or more secondary sidelink carriers.

Some aspects described herein relate to a non-transitory computer-readable medium that stores a set of instructions for wireless communication by a UE. The set of instructions, when executed by one or more processors of the UE, may cause the UE to transmit reference signals on a primary sidelink carrier and on one or more secondary sidelink carriers using carrier aggregation. The set of instructions, when executed by one or more processors of the UE, may cause the UE to receive a MAC CE that indicates a beam failure on the primary sidelink carrier, the one or more secondary sidelink carriers, or both. The set of instructions, when executed by one or more processors of the UE, may cause the UE to transmit, in response to receiving the MAC CE, an aperiodic reference signal on the primary sidelink carrier.

Some aspects described herein relate to a non-transitory computer-readable medium that stores a set of instructions for wireless communication by a UE. The set of instructions, when executed by one or more processors of the UE, may cause the UE to transmit reference signals on a primary sidelink carrier and on one or more secondary sidelink carriers using carrier aggregation. The set of instructions, when executed by one or more processors of the UE, may cause the UE to receive a first MAC CE that indicates a failure of a beam on a secondary sidelink carrier of the one or more secondary sidelink carriers. The set of instructions, when executed by one or more processors of the UE, may cause the UE to transmit, in response to receiving the first MAC CE, one or more aperiodic reference signals on other secondary sidelink carriers of the one or more secondary sidelink carriers. The set of instructions, when executed by one or more processors of the UE, may cause the UE to receive a message indicating one or more beams of the other secondary sidelink carriers that are viable. The set of instructions, when executed by one or more processors of the UE, may cause the UE to transmit, via a second MAC CE on the primary sidelink carrier, a beam switch message based at least in part on the one or more beams that are viable.

Some aspects described herein relate to a non-transitory computer-readable medium that stores a set of instructions for wireless communication by a UE. The set of instructions, when executed by one or more processors of the UE, may cause the UE to receive reference signals on a primary sidelink carrier and on one or more secondary sidelink carriers using carrier aggregation. The set of instructions, when executed by one or more processors of the UE, may cause the UE to detect a beam failure based at least in part on measurement of the reference signals. The set of instructions, when executed by one or more processors of the UE, may cause the UE to transmit a first aperiodic MAC CE that indicates a failure of one or more beams on one or more of the primary sidelink carrier or the one or more secondary sidelink carriers.

Some aspects described herein relate to an apparatus for wireless communication. The apparatus may include means for transmitting reference signals on a primary sidelink carrier and on one or more secondary sidelink carriers using carrier aggregation. The apparatus may include means for receiving a MAC CE that indicates a beam failure on the primary sidelink carrier, the one or more secondary sidelink carriers, or both. The apparatus may include means for transmitting, in response to receiving the MAC CE, an aperiodic reference signal on the primary sidelink carrier.

Some aspects described herein relate to an apparatus for wireless communication. The apparatus may include means for transmitting reference signals on a primary sidelink carrier and on one or more secondary sidelink carriers using carrier aggregation. The apparatus may include means for receiving a first MAC CE that indicates a failure of a beam on a secondary sidelink carrier of the one or more secondary sidelink carriers. The apparatus may include means for transmitting, in response to receiving the first MAC CE, one or more aperiodic reference signals on other secondary sidelink carriers of the one or more secondary sidelink carriers. The apparatus may include means for receiving a message indicating one or more beams of the other secondary sidelink carriers that are viable. The apparatus may include means for transmitting, via a second MAC CE on the primary sidelink carrier, a beam switch message based at least in part on the one or more beams that are viable.

Some aspects described herein relate to an apparatus for wireless communication. The apparatus may include means for receiving reference signals on a primary sidelink carrier and on one or more secondary sidelink carriers using carrier aggregation. The apparatus may include means for detecting a beam failure based at least in part on measurement of the reference signals. The apparatus may include means for transmitting a first aperiodic MAC CE that indicates a failure of one or more beams on one or more of the primary sidelink carrier or the one or more secondary sidelink carriers.

Aspects generally include a method, apparatus, system, computer program product, non-transitory computer-readable medium, user equipment, base station, network entity, network node, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 11 is a diagram illustrating an example process performed, for example, by a UE, in accordance with the present disclosure.

FIG. 12 is a diagram illustrating an example process performed, for example, by a UE, in accordance with the present disclosure.

FIG. 13 is a diagram illustrating an example process performed, for example, by a UE, in accordance with the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
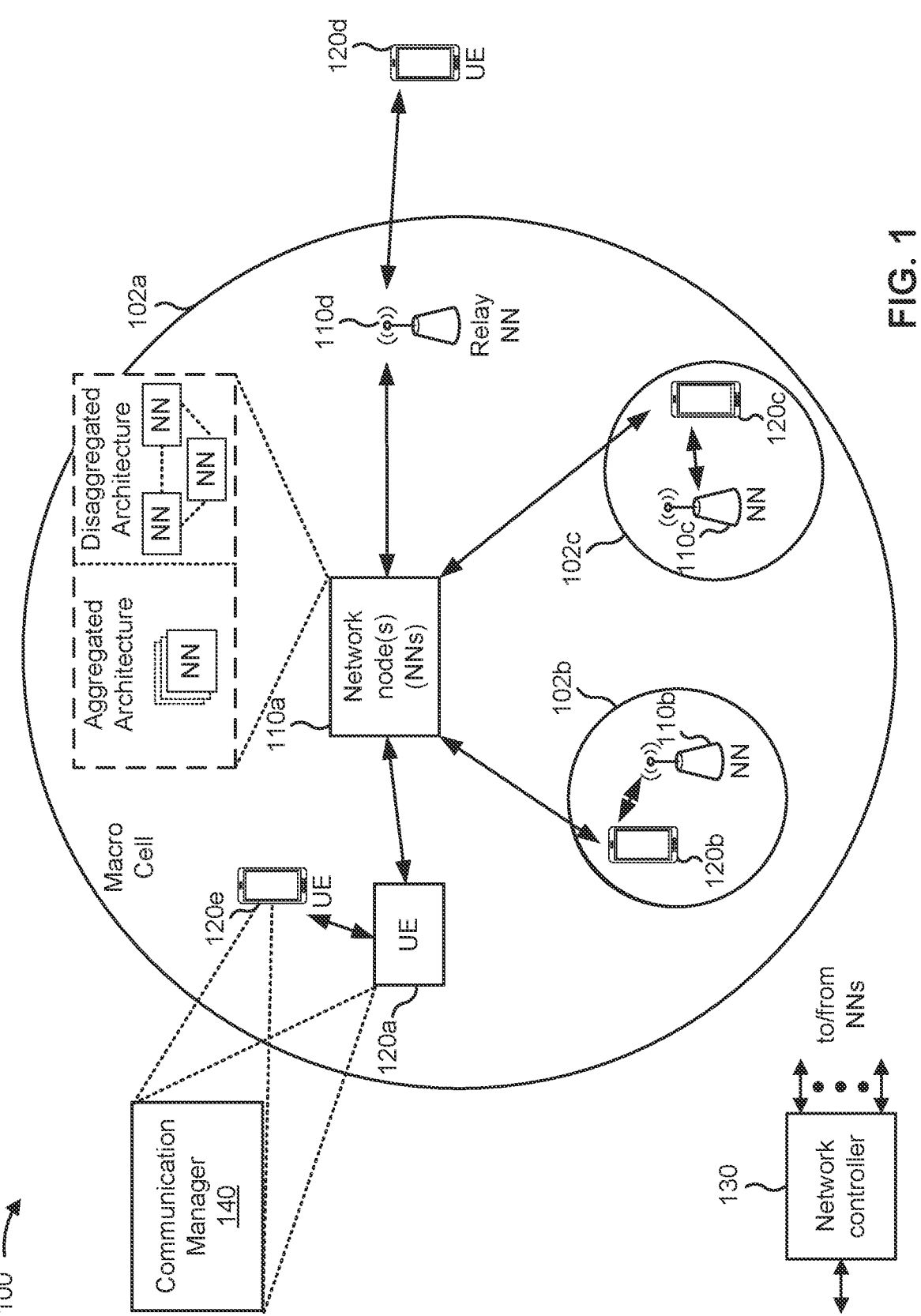
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more network nodes 110 (shown as a network node 110a, a network node 110b, a network node 110c, and a network node 110d), a user equipment (UE) 120 or multiple UEs 120 (shown as a UE 120a, a UE 120b, a UE 120c, a UE 120d, and a UE 120e), and/or other entities. A network node 110 is a network node that communicates with UEs 120. As shown, a network node 110 may include one or more network nodes. For example, a network node 110 may be an aggregated network node, meaning that the aggregated network node is configured to utilize a radio protocol stack that is physically or logically integrated within a single radio access network (RAN) node (e.g., within a single device or unit). As another example, a network node 110 may be a disaggregated network node (sometimes referred to as a disaggregated base station), meaning that the network node 110 is configured to utilize a protocol stack that is physically or logically distributed among two or more nodes (such as one or more central units (CUs), one or more distributed units (DUs), or one or more radio units (RUs)).

In some examples, a network node 110 is or includes a network node that communicates with UEs 120 via a radio access link, such as an RU. In some examples, a network node 110 is or includes a network node that communicates with other network nodes 110 via a fronthaul link or a midhaul link, such as a DU. In some examples, a network node 110 is or includes a network node that communicates with other network nodes 110 via a midhaul link or a core network via a backhaul link, such as a CU. In some examples, a network node 110 (such as an aggregated network node 110 or a disaggregated network node 110) may include multiple network nodes, such as one or more RUs, one or more CUs, and/or one or more DUs. A network node 110 may include, for example, an NR base station, an LTE base station, a Node B, an eNB (e.g., in 4G), a gNB (e.g., in 5G), an access point, a transmit receive point (TRP), a DU, an RU, a CU, a mobility element of a network, a core network node, a network element, a network equipment, a RAN node, or a combination thereof. In some examples, the network nodes 110 may be interconnected to one another or to one or more other network nodes 110 in the wireless network 100 through various types of fronthaul, midhaul, and/or backhaul interfaces, such as a direct physical connection, an air interface, or a virtual network, using any suitable transport network.

In some examples, a network node 110 may provide communication coverage for a particular geographic area. In the Third Generation Partnership Project (3GPP), the term "cell" can refer to a coverage area of a network node 110 and/or a network node subsystem serving this coverage area, depending on the context in which the term is used. A network node 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscriptions. A femto cell may cover a relatively small geographic area (e.g., a home) and may allow restricted access by UEs 120 having association with the femto cell (e.g., UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In the example shown in FIG. 1, the network node 110*a* may be a macro network node for a macro cell 102*a*, the network node 110*b* may be a pico network node for a pico cell 102*b*, and the network node 110*c* may be a femto network node for a femto cell 102*c*. A network node may support one or multiple (e.g., three) cells. In some examples, a cell may not necessarily be stationary, and the geographic area of the cell may move according to the location of a network node 110 that is mobile (e.g., a mobile network node).

In some aspects, the term "base station" or "network node" may refer to an aggregated base station, a disaggregated base station, an integrated access and backhaul (IAB) node, a relay node, or one or more components thereof. For example, in some aspects, "base station" or "network node" may refer to a CU, a DU, an RU, a Near-Real Time (Near-RT) RAN Intelligent Controller (RIC), or a Non-Real Time (Non-RT) RIC, or a combination thereof. In some aspects, the term "base station" or "network node" may refer to one device configured to perform one or more functions, such as those described herein in connection with the network node 110. In some aspects, the term "base station" or "network node" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the term "base station" or "network node" may refer to any one or more of those different devices. In some aspects, the term "base station" or "network node" may refer to one or more virtual base stations or one or more virtual base station functions. For example, in some aspects, two or more base station functions may be instantiated on a single device. In some aspects, the term "base station" or "network node" may refer to one of the base station functions and not another. In this way, a single device may include more than one base station.

The wireless network 100 may include one or more relay stations. A relay station is a network node that can receive a transmission of data from an upstream node (e.g., a network node 110 or a UE 120) and send a transmission of the data to a downstream node (e.g., a UE 120 or a network node 110). A relay station may be a UE 120 that can relay transmissions for other UEs 120. In the example shown in FIG. 1, the network node 110*d* (e.g., a relay network node) may communicate with the network node 110*a* (e.g., a macro network node) and the UE 120*d* in order to facilitate communication between the network node 110*a* and the UE 120*d*. A network node 110 that relays communications may be referred to as a relay station, a relay base station, a relay network node, a relay node, a relay, or the like.

The wireless network 100 may be a heterogeneous network that includes network nodes 110 of different types, such as macro network nodes, pico network nodes, femto network nodes, relay network nodes, or the like. These different types of network nodes 110 may have different transmit power levels, different coverage areas, and/or different impacts on interference in the wireless network 100. For example, macro network nodes may have a high transmit power level (e.g., 5 to 40 watts) whereas pico network nodes, femto network nodes, and relay network nodes may have lower transmit power levels (e.g., 0.1 to 2 watts).

A network controller 130 may couple to or communicate with a set of network nodes 110 and may provide coordination and control for these network nodes 110. The network controller 130 may communicate with the network nodes 110 via a backhaul communication link or a midhaul communication link. The network nodes 110 may communicate with one another directly or indirectly via a wireless or wireline backhaul communication link. In some aspects, the network controller 130 may be a CU or a core network device, or may include a CU or a core network device.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, a UE function of a network node, and/or any other suitable device that is configured to communicate via a wireless or wired medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a network node, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a network node 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the network node 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may transmit reference signals on a primary sidelink carrier and on one or more secondary sidelink carriers using carrier aggregation. The communication manager 140 may receive a medium access control element (MAC CE) that indicates a beam failure on the primary sidelink carrier, the one or more secondary sidelink carriers, or both. The communication manager 140 may transmit, in response to receiving the MAC CE, an aperiodic reference signal on the primary sidelink carrier.

In some aspects, the communication manager 140 may transmit reference signals on a primary sidelink carrier and on one or more secondary sidelink carriers using carrier aggregation. The communication manager 140 may receive a first MAC CE that indicates a failure of a beam on a secondary sidelink carrier of the one or more secondary sidelink carriers. The communication manager 140 may transmit, in response to receiving the first MAC CE, one or more aperiodic reference signals on other secondary sidelink carriers of the one or more secondary sidelink carriers. The communication manager 140 may receive a message indicating one or more beams of the other secondary sidelink carriers that are viable and transmit, via a second MAC CE on the primary sidelink carrier, a beam switch message based at least in part on the one or more beams that are viable.

In some aspects, the communication manager 140 may receive reference signals on a primary sidelink carrier and on one or more secondary sidelink carriers using carrier aggregation. The communication manager 140 may detect a beam failure based at least in part on measurement of the reference signals and transmit a first aperiodic MAC CE that indicates a failure of one or more beams on one or more of the primary sidelink carrier or the one or more secondary sidelink carriers. Additionally, or alternatively, the communication manager 140 may perform one or more other operations described herein.

As indicated above, FIG. 1 is provided as an example. Other examples may differ from what is described with regard to FIG. 1.

Figure 2:
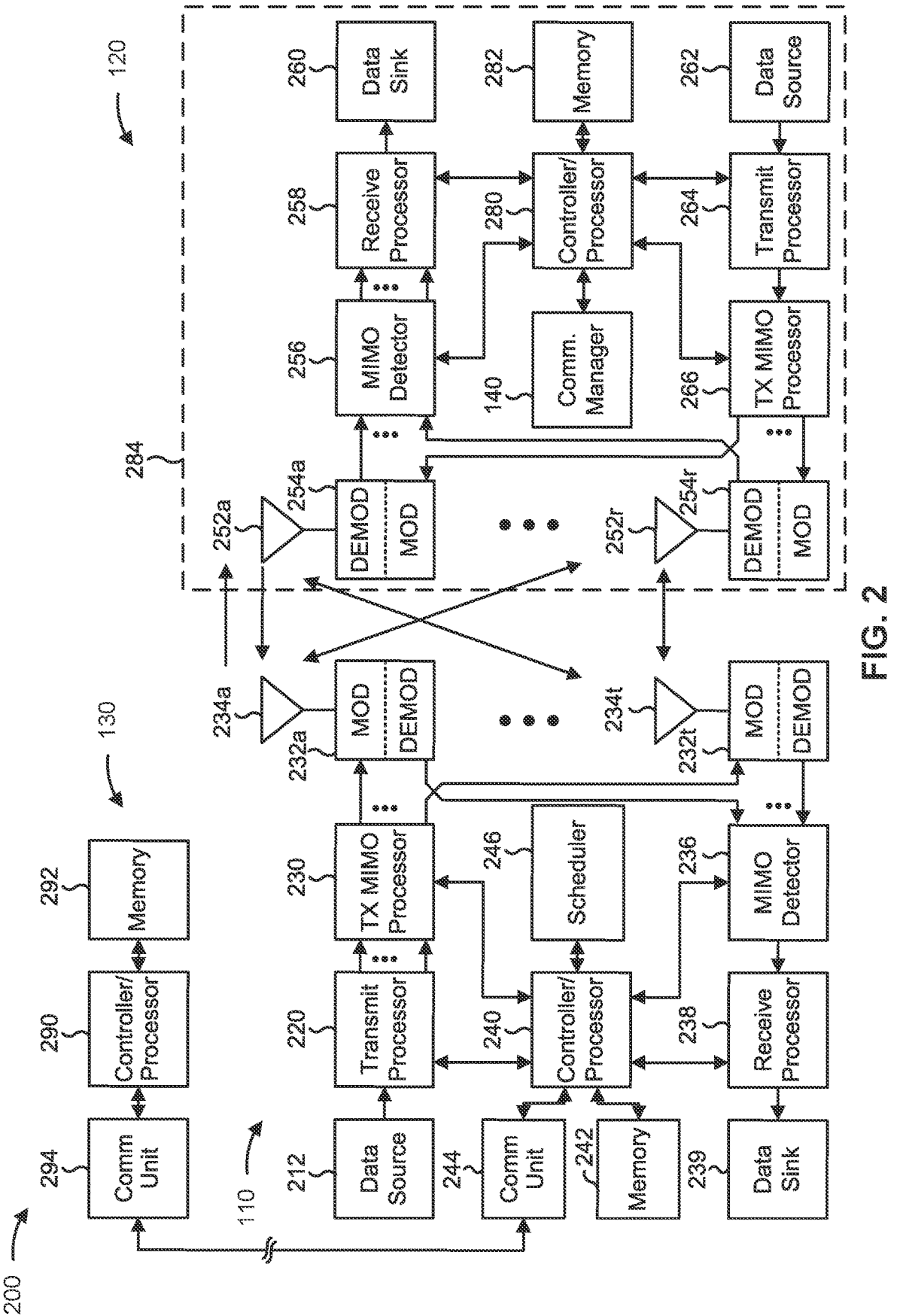
FIG. 2 is a diagram illustrating an example of a network node in communication with a user equipment (UE) in a wireless network, in accordance with the present disclosure.

FIG. 2 is a diagram illustrating an example 200 of a network node 110 in communication with a UE 120 in a wireless network 100, in accordance with the present disclosure. The network node 110 may be equipped with a set of antennas 234*a* through 234*t*, such as T antennas (T≤1). The UE 120 may be equipped with a set of antennas 252*a* through 252*r*, such as R antennas (R≤1). The network node 110 of example 200 includes one or more radio frequency components, such as antennas 234 and a modem 254. In some examples, a network node 110 may include an interface, a communication component, or another component that facilitates communication with the UE 120 or another network node. Some network nodes 110 may not include radio frequency components that facilitate direct communication with the UE 120, such as one or more CUs, or one or more DUs.

At the network node 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The network node 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232*a* through 232*t*. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232*a* through 232*t* may transmit a set of downlink signals (e.g., T downlink signals) via a corresponding set of antennas 234 (e.g., T antennas), shown as antennas 234*a* through 234*t*.

At the UE 120, a set of antennas 252 (shown as antennas 252*a* through 252*r*) may receive the downlink signals from the network node 110 and/or other network nodes 110 and may provide a set of received signals (e.g., R received signals) to a set of modems 254 (e.g., R modems), shown as modems 254*a* through 254*r*. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the network node 110 via the communication unit 294.

One or more antennas (e.g., antennas 234*a* through 234*t* and/or antennas 252*a* through 252*r*) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the network node 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 3-14).

At the network node 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network node 110 may include a communication unit 244 and may communicate with the network controller 130 via the communication unit 244. The network node 110 may include a scheduler 246 to schedule one or more UEs 120 for downlink and/or uplink communications. In some examples, the modem 232 of the network node 110 may include a modulator and a demodulator. In some examples, the network node 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 3-14).

The controller/processor 280 of the UE 120 and/or any other component(s) of FIG. 2 may perform one or more techniques associated with beam failure recovery for sidelink carrier aggregation, as described in more detail elsewhere herein. For example, the controller/processor 280 of the UE 120, and/or any other component(s) of FIG. 2 may perform or direct operations of, for example, process 1100 of FIG. 11, process 1200 of FIG. 12, process 1300 of FIG. 13, and/or other processes as described herein. The memory 282 may store data and program codes for the UE 120. In some examples, the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the UE 120, may cause the one or more processors or the UE 120 to perform or direct operations of, for example, process 1100 of FIG. 11, process 1200 of FIG. 12, process 1300 of FIG. 13, and/or other processes as described herein. In some examples, executing instructions may include running the instructions, converting the instructions, compiling the instructions, and/or interpreting the instructions, among other examples.

In some aspects, the UE 120 includes means for transmitting reference signals on a primary sidelink carrier and on one or more secondary sidelink carriers using carrier aggregation (e.g., using controller/processor 280, transmit processor 264, TX MIMO processor 266, modem 254, antenna 252, memory 282, or the like); means for receiving a MAC CE that indicates a beam failure on the primary sidelink carrier, the one or more secondary sidelink carriers, or both (e.g., using antenna 252, modem 254, MIMO detector 256, receive processor 258, controller/processor 280, memory 282, or the like); and/or means for transmitting, in response to receiving the MAC CE, an aperiodic reference signal on the primary sidelink carrier (e.g., using controller/processor 280, transmit processor 264, TX MIMO processor 266, modem 254, antenna 252, memory 282, or the like).

In some aspects, the UE 120 includes means for transmitting reference signals on a primary sidelink carrier and on one or more secondary sidelink carriers using carrier aggregation (e.g., using controller/processor 280, transmit processor 264, TX MIMO processor 266, modem 254, antenna 252, memory 282, or the like); means for receiving a first MAC CE that indicates a failure of a beam on a secondary sidelink carrier of the one or more secondary sidelink carriers (e.g., using antenna 252, modem 254, MIMO detector 256, receive processor 258, controller/processor 280, memory 282, or the like); means for transmitting, in response to receiving the first MAC CE, one or more aperiodic reference signals on other secondary sidelink carriers of the one or more secondary sidelink carriers (e.g., using controller/processor 280, transmit processor 264, TX MIMO processor 266, modem 254, antenna 252, memory 282, or the like); means for receiving a message indicating one or more beams of the other secondary sidelink carriers that are viable (e.g., using antenna 252, modem 254, MIMO detector 256, receive processor 258, controller/processor 280, memory 282, or the like); and/or means for transmitting, via a second MAC CE on the primary sidelink carrier, a beam switch message based at least in part on the one or more beams that are viable (e.g., using controller/processor 280, transmit processor 264, TX MIMO processor 266, modem 254, antenna 252, memory 282, or the like).

In some aspects, the UE 120 includes means for receiving reference signals on a primary sidelink carrier and on one or more secondary sidelink carriers using carrier aggregation; means for detecting a beam failure based at least in part on measurement of the reference signals (e.g., using antenna 252, modem 254, MIMO detector 256, receive processor 258, controller/processor 280, memory 282, or the like); and/or means for transmitting a first aperiodic MAC CE that indicates a failure of one or more beams on one or more of the primary sidelink carrier or the one or more secondary sidelink carriers (e.g., using controller/processor 280, transmit processor 264, TX MIMO processor 266, modem 254, antenna 252, memory 282, or the like).

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (eNB), an NR BS, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, one or more RUs, or a combination thereof).

An aggregated base station (e.g., an aggregated network node) may be configured to utilize a radio protocol stack that is physically or logically integrated within a single RAN node (e.g., within a single device or unit). A disaggregated base station (e.g., a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

Figure 3:
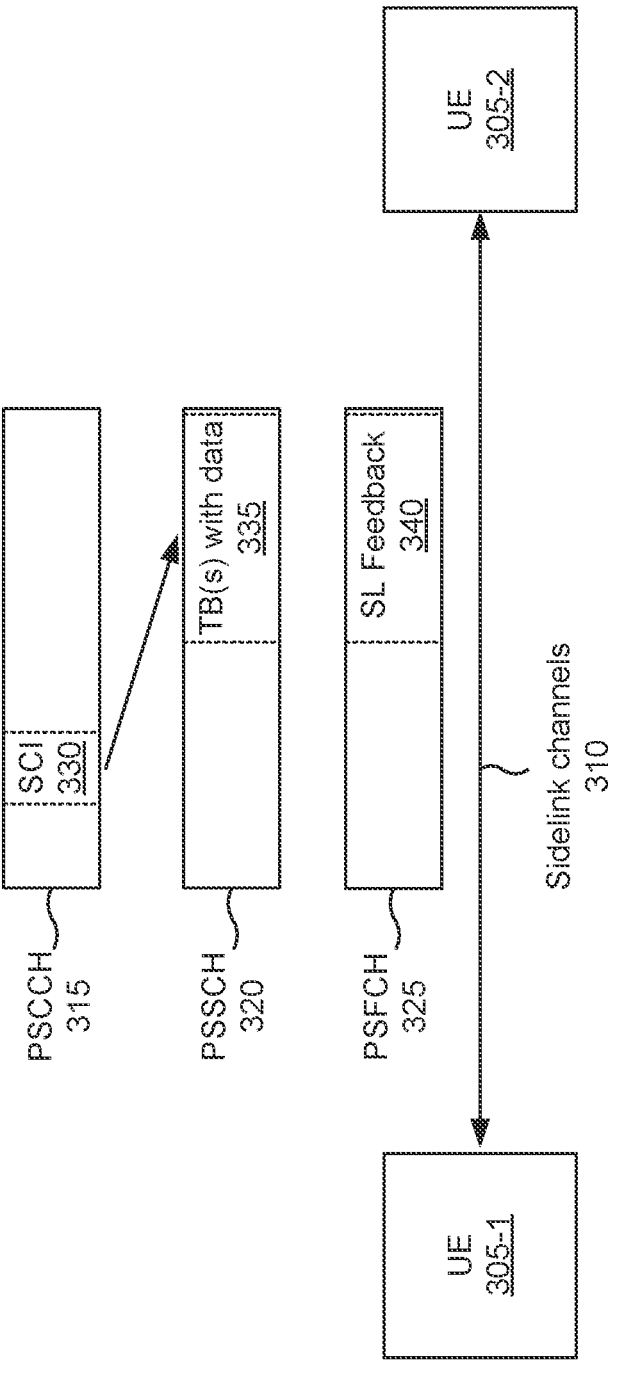
FIG. 3 is a diagram illustrating an example of sidelink communications, in accordance with the present disclosure.

FIG. 3 is a diagram illustrating an example 300 of sidelink communications, in accordance with the present disclosure.

As shown in FIG. 3, a first UE 305-1 may communicate with a second UE 305-2 (and one or more other UEs 305) via one or more sidelink channels 310. The UEs 305-1 and 305-2 may communicate using the one or more sidelink channels 310 for P2P communications, D2D communications, V2X communications (e.g., which may include V2V communications, V2I communications, and/or V2P communications) and/or mesh networking. In some aspects, the UEs 305 (e.g., UE 305-1 and/or UE 305-2) may correspond to one or more other UEs described elsewhere herein, such as UE 120. In some aspects, the one or more sidelink channels 310 may use a PC5 interface and/or may operate in a high frequency band (e.g., the 5.9 GHz band). Additionally, or alternatively, the UEs 305 may synchronize timing of transmission time intervals (TTIs) (e.g., frames, subframes, slots, or symbols) using global navigation satellite system (GNSS) timing.

As further shown in FIG. 3, the one or more sidelink channels 310 may include a physical sidelink control channel (PSCCH) 315, a physical sidelink shared channel (PSSCH) 320, and/or a physical sidelink feedback channel (PSFCH) 325. The PSCCH 315 may be used to communicate control information, similar to a physical downlink control channel (PDCCH) and/or a physical uplink control channel (PUCCH) used for cellular communications with a network node 110 via an access link or an access channel. The PSSCH 320 may be used to communicate data, similar to a physical downlink shared channel (PDSCH) and/or a physical uplink shared channel (PUSCH) used for cellular communications with a network node 110 via an access link or an access channel. For example, the PSCCH 315 may carry sidelink control information (SCI) 330, which may indicate various control information used for sidelink communications, such as one or more resources (e.g., time resources, frequency resources, and/or spatial resources) where a transport block (TB) 335 may be carried on the PSSCH 320. The TB 335 may include data. The PSFCH 325 may be used to communicate sidelink feedback 340, such as hybrid automatic repeat request (HARQ) feedback (e.g., acknowledgement or negative acknowledgement (ACK/NACK) information), transmit power control (TPC), and/or a scheduling request (SR).

Although shown on the PSCCH 315, in some aspects, the SCI 330 may include multiple communications in different stages, such as a first stage SCI (SCI-1) and a second stage SCI (SCI-2). The SCI-1 may be transmitted on the PSCCH 315. The SCI-2 may be transmitted on the PSSCH 320. The SCI-1 may include, for example, an indication of one or more resources (e.g., time resources, frequency resources, and/or spatial resources) on the PSSCH 320, information for decoding sidelink communications on the PSSCH, a quality of service (QoS) priority value, a resource reservation period, a PSSCH DMRS pattern, an SCI format for the SCI-2, a beta offset for the SCI-2, a quantity of PSSCH DMRS ports, and/or an MCS. The SCI-2 may include information associated with data transmissions on the PSSCH 320, such as a HARQ process ID, a new data indicator (NDI), a source identifier, a destination identifier, and/or a channel state information (CSI) report trigger.

In some aspects, the one or more sidelink channels 310 may use resource pools. For example, a scheduling assignment (e.g., included in SCI 330) may be transmitted in sub-channels using specific resource blocks (RBs) across time. In some aspects, data transmissions (e.g., on the PSSCH 320) associated with a scheduling assignment may occupy adjacent RBs in the same subframe as the scheduling assignment (e.g., using frequency division multiplexing). In some aspects, a scheduling assignment and associated data transmissions are not transmitted on adjacent RBs.

In some aspects, a UE 305 may operate using a sidelink transmission mode (e.g., Mode 1) where resource selection and/or scheduling is performed by a network node 110 (e.g., a base station, a CU, or a DU). For example, the UE 305 may receive a grant (e.g., in downlink control information (DCI) or in a radio resource control (RRC) message, such as for configured grants) from the network node 110 (e.g., directly or via one or more network nodes) for sidelink channel access and/or scheduling. In some aspects, a UE 305 may operate using a transmission mode (e.g., Mode 2) where resource selection and/or scheduling is performed by the UE 305 (e.g., rather than a network node 110). In some aspects, the UE 305 may perform resource selection and/or scheduling by sensing channel availability for transmissions. For example, the UE 305 may measure an RSSI parameter (e.g., a sidelink-RSSI (S-RSSI) parameter) associated with various sidelink channels, may measure an RSRP parameter (e.g., a PSSCH-RSRP parameter) associated with various sidelink channels, and/or may measure an RSRQ parameter (e.g., a PSSCH-RSRQ parameter) associated with various sidelink channels, and may select a channel for transmission of a sidelink communication based at least in part on the measurement(s).

Additionally, or alternatively, the UE 305 may perform resource selection and/or scheduling using SCI 330 received in the PSCCH 315, which may indicate occupied resources and/or channel parameters. Additionally, or alternatively, the UE 305 may perform resource selection and/or scheduling by determining a channel busy ratio (CBR) associated with various sidelink channels, which may be used for rate control (e.g., by indicating a maximum number of resource blocks that the UE 305 can use for a particular set of subframes).

In the transmission mode where resource selection and/or scheduling is performed by a UE 305, the UE 305 may generate sidelink grants, and may transmit the grants in SCI 330. A sidelink grant may indicate, for example, one or more parameters (e.g., transmission parameters) to be used for an upcoming sidelink transmission, such as one or more resource blocks to be used for the upcoming sidelink transmission on the PSSCH 320 (e.g., for TBs 335), one or more subframes to be used for the upcoming sidelink transmission, and/or an MCS to be used for the upcoming sidelink transmission. In some aspects, a UE 305 may generate a sidelink grant that indicates one or more parameters for semi-persistent scheduling (SPS), such as a periodicity of a sidelink transmission. Additionally, or alternatively, the UE 305 may generate a sidelink grant for event-driven scheduling, such as for an on-demand sidelink message.

As indicated above, FIG. 3 is provided as an example. Other examples may differ from what is described with respect to FIG. 3.

Figure 4:
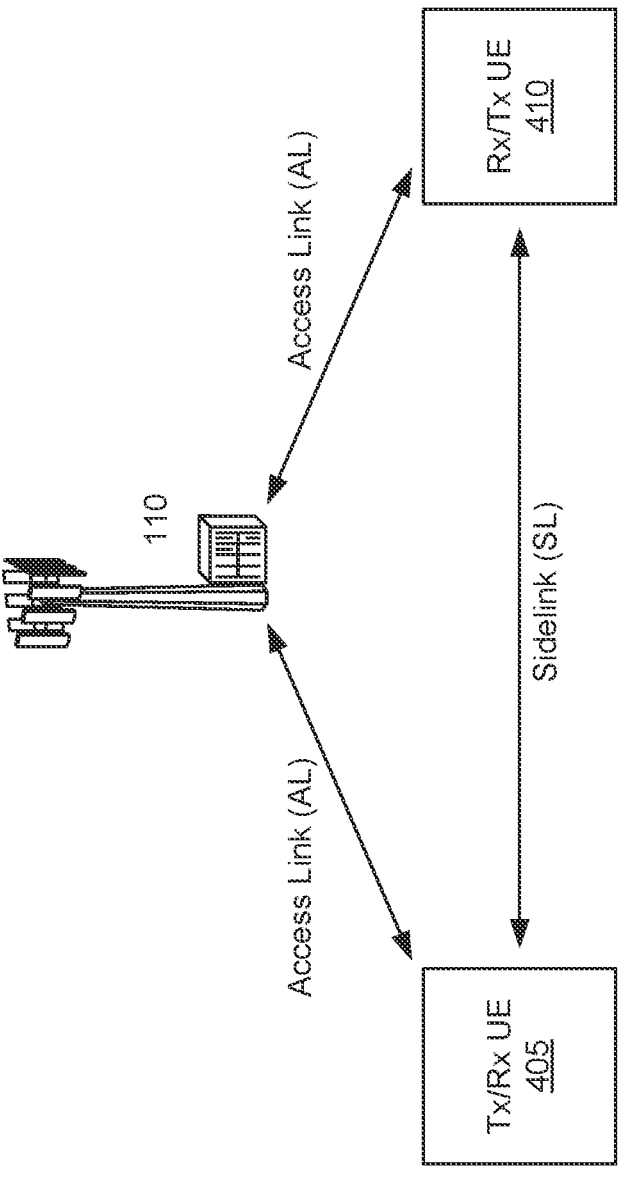
FIG. 4 is a diagram illustrating an example of sidelink communications and access link communications, in accordance with the present disclosure.

FIG. 4 is a diagram illustrating an example 400 of sidelink communications and access link communications, in accordance with the present disclosure.

As shown in FIG. 4, a transmitter (Tx)/receiver (Rx) UE 405 and an Rx/Tx UE 410 may communicate with one another via a sidelink, as described above in connection with FIG. 4. As further shown, in some sidelink modes, a network node 110 may communicate with the Tx/Rx UE 405 (e.g., directly or via one or more network nodes), such as via a first access link. Additionally, or alternatively, in some sidelink modes, the network node 110 may communicate with the Rx/Tx UE 410 (e.g., directly or via one or more network nodes), such as via a first access link. The Tx/Rx UE 405 and/or the Rx/Tx UE 410 may correspond to one or more UEs described elsewhere herein, such as the UE 120 of FIG. 1. Thus, a direct link between UEs 120 (e.g., via a PC5 interface) may be referred to as a sidelink, and a direct link between a network node 110 and a UE 120 (e.g., via a Uu interface) may be referred to as an access link. Sidelink communications may be transmitted via the sidelink, and access link communications may be transmitted via the access link. An access link communication may be either a downlink communication (from a network node 110 to a UE 120) or an uplink communication (from a UE 120 to a network node 110).

A UE 120 may use carrier aggregation for sidelink channels. Carrier aggregation is a technology that enables two or more component carriers (CCs, sometimes referred to as carriers) to be combined (e.g., into a single channel) for a single UE 120 to enhance data capacity. Carriers can be combined in the same or different frequency bands. Additionally, or alternatively, contiguous or non-contiguous carriers can be combined. A network node 110 may configure carrier aggregation for a UE 120, such as in an RRC message, DCI, and/or another signaling message.

In some aspects, carrier aggregation may be configured in an intra-band contiguous mode where the aggregated carriers are contiguous to one another and are in the same band. In some aspects, carrier aggregation may be configured in an intra-band non-contiguous mode where the aggregated carriers are non-contiguous to one another and are in the same band. In some aspects, carrier aggregation may be configured in an inter-band non-contiguous mode where the aggregated carriers are non-contiguous to one another and are in different bands.

In carrier aggregation, a UE 120 may be configured with a primary carrier or primary cell (PCell) and one or more secondary carriers or secondary cells (SCells). In some aspects, the primary carrier may carry control information (e.g., DCI and/or scheduling information) for scheduling data communications on one or more secondary carriers, which may be referred to as cross-carrier scheduling. In some aspects, a carrier (e.g., a primary carrier or a secondary carrier) may carry control information for scheduling data communications on the carrier, which may be referred to as self-carrier scheduling or carrier self-scheduling. In some aspects, carrier aggregation may include multiple secondary carriers (without the primary). Some carrier aggregation configurations may provide for CC activation and deactivation, cross-carrier grants (grant for one carrier provide on another carrier), beam indications, and/or multi-bit feedback.

As indicated above, FIG. 4 is provided as an example. Other examples may differ from what is described with respect to FIG. 4.

Figure 5:
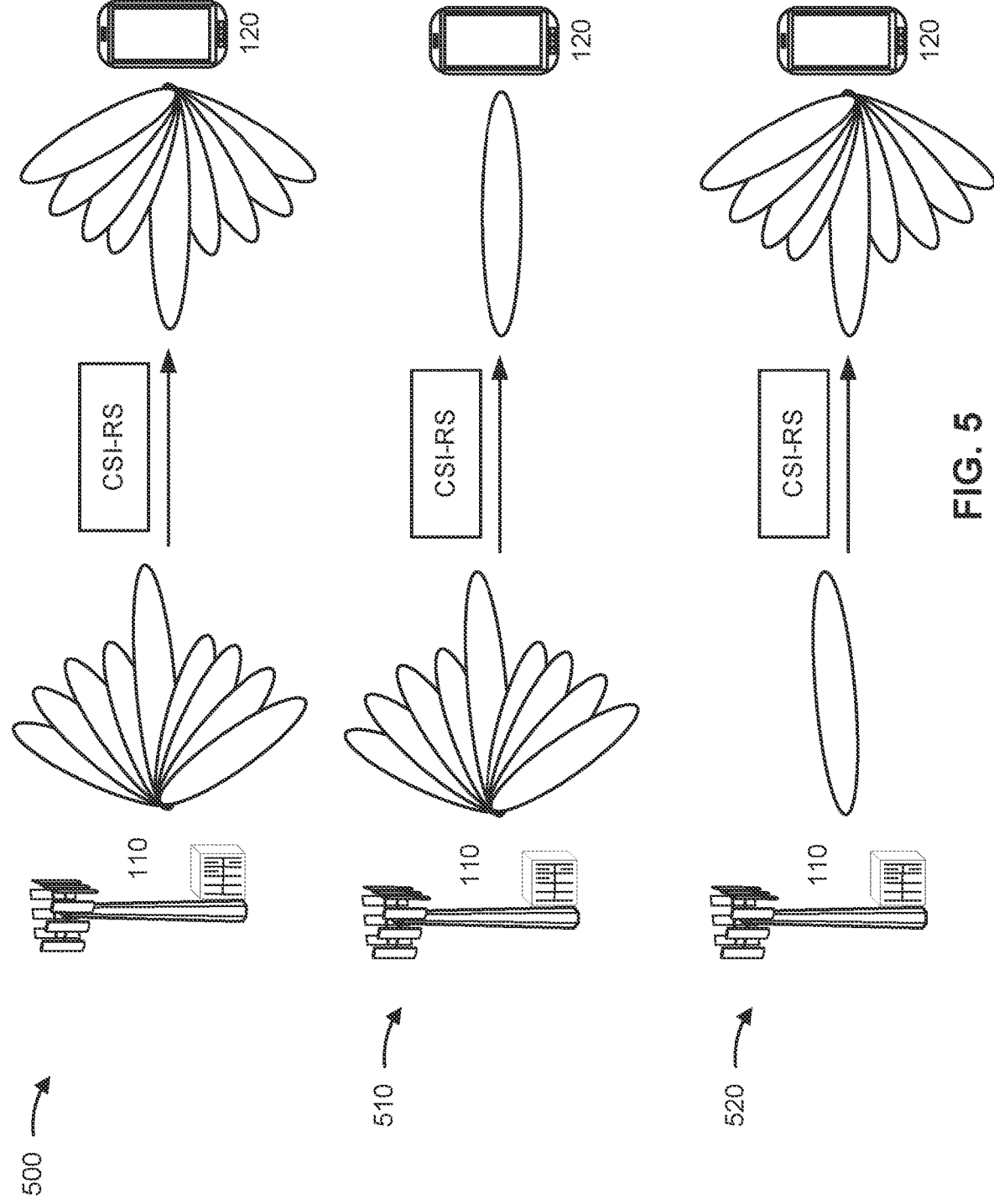
FIG. 5 is a diagram illustrating examples of channel state information reference signal beam management procedures, in accordance with the present disclosure.

FIG. 5 is a diagram illustrating examples 500, 510, and 520 of CSI reference signal (CSI-RS) beam management procedures, in accordance with the present disclosure. As shown in FIG. 5, examples 500, 510, and 520 include a UE 120 in communication with a network node 110 in a wireless network (e.g., wireless network 100). However, the devices shown in FIG. 5 are provided as examples, and the wireless network may support communication and beam management between other devices (e.g., between a UE 120 and a network node 110 or TRP, between a mobile termination node and a control node, between an IAB child node and an IAB parent node, and/or between a scheduled node and a scheduling node). In some aspects, the UE 120 and the network node 110 may be in a connected state (e.g., an RRC connected state).

As shown in FIG. 5, example 500 may include a network node 110 (e.g., one or more network node devices such as an RU, a DU, and/or a CU, among other examples) and a UE 120 communicating to perform beam management using CSI-RSs. Example 500 depicts a first beam management procedure (e.g., P1 CSI-RS beam management).

The first beam management procedure may be referred to as a beam selection procedure, an initial beam acquisition procedure, a beam sweeping procedure, a cell search procedure, and/or a beam search procedure. As shown in FIG. 5 and example 500, CSI-RSs may be configured to be transmitted from the network node 110 to the UE 120. The CSI-RSs may be configured to be periodic (e.g., using RRC signaling), semi-persistent (e.g., using MAC CE signaling), and/or aperiodic (e.g., using DCI).

The first beam management procedure may include the network node 110 performing beam sweeping over multiple transmit (Tx) beams. The network node 110 may transmit a CSI-RS using each transmit beam for beam management. To enable the UE 120 to perform receive (Rx) beam sweeping, the network node may use a transmit beam to transmit (e.g., with repetitions) each CSI-RS at multiple times within the same RS resource set so that the UE 120 can sweep through receive beams in multiple transmission instances. For example, if the network node 110 has a set of N transmit beams and the UE 120 has a set of M receive beams, the CSI-RS may be transmitted on each of the N transmit beams M times so that the UE 120 may receive M instances of the CSI-RS per transmit beam. In other words, for each transmit beam of the network node 110, the UE 120 may perform beam sweeping through the receive beams of the UE 120. As a result, the first beam management procedure may enable the UE 120 to measure a CSI-RS on different transmit beams using different receive beams to support selection of network node 110 transmit beams/UE 120 receive beam(s) beam pair(s). The UE 120 may report the measurements to the network node 110 to enable the network node 110 to select one or more beam pair(s) for communication between the network node 110 and the UE 120. While example 500 has been described in connection with CSI-RSs, the first beam management process may also use synchronization signal blocks (SSBs) for beam management in a similar manner as described above.

As shown in FIG. 5, example 510 may include a network node 110 and a UE 120 communicating to perform beam management using CSI-RSs. Example 510 depicts a second beam management procedure (e.g., P2 CSI-RS beam management). The second beam management procedure may be referred to as a beam refinement procedure, a network node beam refinement procedure, a TRP beam refinement procedure, and/or a transmit beam refinement procedure. As shown in FIG. 5 and example 510, CSI-RSs may be configured to be transmitted from the network node 110 to the UE 120. The CSI-RSs may be configured to be aperiodic (e.g., using DCI). The second beam management procedure may include the network node 110 performing beam sweeping over one or more transmit beams. The one or more transmit beams may be a subset of all transmit beams associated with the network node 110 (e.g., determined based at least in part on measurements reported by the UE 120 in connection with the first beam management procedure). The network node 110 may transmit a CSI-RS using each transmit beam of the one or more transmit beams for beam management. The UE 120 may measure each CSI-RS using a single (e.g., a same) receive beam (e.g., determined based at least in part on measurements performed in connection with the first beam management procedure). The second beam management procedure may enable the network node 110 to select a best transmit beam based at least in part on measurements of the CSI-RSs (e.g., measured by the UE 120 using the single receive beam) reported by the UE 120.

As shown in FIG. 5, example 520 depicts a third beam management procedure (e.g., P3 CSI-RS beam management). The third beam management procedure may be referred to as a beam refinement procedure, a UE beam refinement procedure, and/or a receive beam refinement procedure. As shown in FIG. 5 and example 520, one or more CSI-RSs may be configured to be transmitted from the network node 110 to the UE 120. The CSI-RSs may be configured to be aperiodic (e.g., using DCI). The third beam management process may include the network node 110 transmitting the one or more CSI-RSs using a single transmit beam (e.g., determined based at least in part on measurements reported by the UE 120 in connection with the first beam management procedure and/or the second beam management procedure). To enable the UE 120 to perform receive beam sweeping, the network node may use a transmit beam to transmit (e.g., with repetitions) CSI-RS at multiple times within the same RS resource set so that UE 120 can sweep through one or more receive beams in multiple transmission instances. The one or more receive beams may be a subset of all receive beams associated with the UE 120 (e.g., determined based at least in part on measurements performed in connection with the first beam management procedure and/or the second beam management procedure). The third beam management procedure may enable the network node 110 and/or the UE 120 to select a best receive beam based at least in part on reported measurements received from the UE 120 (e.g., of the CSI-RS of the transmit beam using the one or more receive beams).

In some examples, a beam may fail during sidelink communications between a transmitting UE and a receiving UE. Beam failure detection (BFD) may include detecting a specified quantity of beam failure instances (e.g., not enough sidelink reference signal strength, too much interference) during a time duration (using a beam failure timer). The receiving UE may transmit a beam failure indication (BFI) over a sidelink channel. This may be a request for beam failure recovery (BFR). BFR many include transmitting a random access channel (RACH) preamble using the same beam or another beam.

As indicated above, FIG. 5 is provided as an example of beam management procedures. Other examples of beam management procedures may differ from what is described with respect to FIG. 5. For example, the UE 120 and the network node 110 may perform the third beam management procedure before performing the second beam management procedure, and/or the UE 120 and the network node 110 may perform a similar beam management procedure to select a UE transmit beam.

Figure 6:
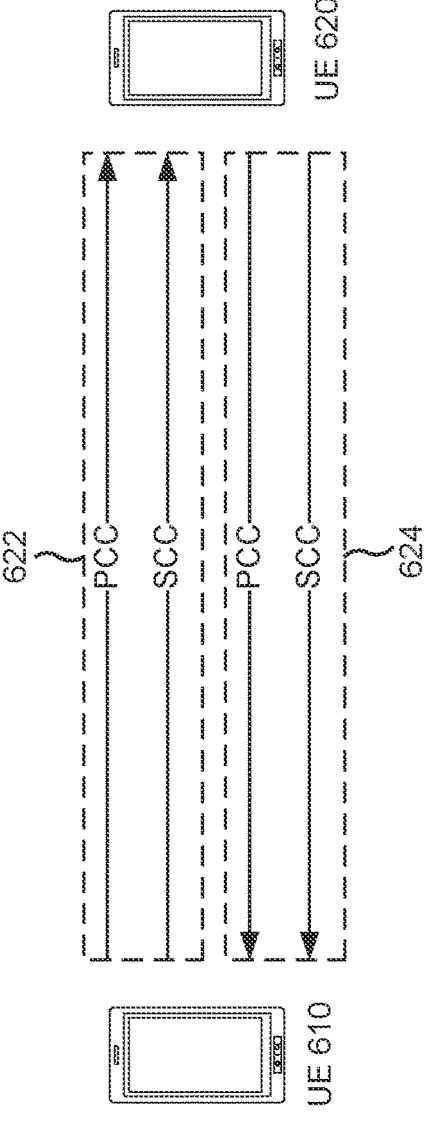
FIG. 6 is a diagram illustrating an example of sidelink carrier aggregation, in accordance with the present disclosure.

FIG. 6 is a diagram illustrating an example 600 of sidelink carrier aggregation, in accordance with the present disclosure. Example 600 shows a UE 610 (e.g., UE 120) and a UE 620 (e.g., UE 120) may communicate with each other over sidelink channels. A PC5-RRC connection or link may be established between UE 610 and UE 620 in each direction.

Example 600 shows a UE 610 and UE 620 using carrier aggregation in both directions. For example, a primary CC (PCC) and a secondary CC (SCC) may be configured per direction (e.g., per UE, per sidelink channel), from UE 610 to UE 620 (in pipe 622) and from UE 620 to UE 610 (in pipe 624). The PCC may be on a different frequency than the SCC in each pipe. Radio link management (RLM) and radio link failure (RLF) may be declared on the PCC per direction. BFR on a PCC may use a RACH procedure, and each RACH procedure may be performed on the PCC per direction. If UE 610 is a transmitting UE, UE 610 may broadcast an SSB on the PCC. UE 610 may transmit periodic, semi-periodic, or aperiodic SSBs based on a power limitation and an interference mitigation criterion. BFR on an SCC may use a beam change based on measurements.

If a sidelink PCC is configured per UE, one CC is configured as the PCC for all sidelinks that the UE established or participates in. To establish a new sidelink to a new UE, there may be an indication from the network or a negotiation between UEs to ensure the configured PCC can still act as the PCC for the new sidelink. The negotiation may be directly between the UE and the new UE.

If a sidelink PCC is configured per sidelink, a specific CC is designated as the PCC for the sidelink. This may be by negotiation or by indication from the network. The CC that is designated as the PCC may be different for different sidelinks. The PCC may be different for unicast sidelinks than for groupcast sidelinks. Groupcast sidelinks may be treated as multiple unicasts for the purpose of establishing a PCC. The UEs may agree on the CC to be used as the PCC. Each UE may have a different set of other CCs besides the PCC and may index its CCs differently, as long as they agree to a common indexing or referencing when having to refer to the PCC.

If a sidelink PCC is configured per sidelink per direction, each sidelink may have two sidelink PCCs, one for a forward direction and one for a reverse direction. That is, there may be one PCC from UE 610 to UE 620 (forward PCC for UE 610 and reverse PCC for UE 620) and another PCC for UE 620 to UE 610 (forward for UE 620 and reverse for UE 610). Note that for sidelink discontinuous reception (DRX), there is an agreement to separately configure UE 610 to UE 620 DRX and UE 620 to UE 610. This has no analogy in Uu as there is no separate DRX or discontinuous transmission (DTX) for downlink or uplink. In one example, the PCC may be configured with a BFD reference signal (RS), or BFD-RS. With bidirectional BFR, the BFD reference signal from UE 610 to UE 620 may be on the UE 610 to UE 620 sidelink PCC, while the BFD reference signal from UE 620 to UE 610 may be on the UE 620 to UE 610 sidelink PCC. In another example, the PCC may be the one carrying feedback on the PSFCH. Therefore, UE 610 to UE 620 sidelink PCC may carry all of the feedback on the PSFCH from UE 620 to UE 610, and the UE 620 to UE 610 sidelink PCC may carry all of the feedback on the PSFCH from UE 610 to UE 620.

A PCC may be part of a PCell, and SCCs may be part of an SCell. SCells can be added and removed, activated and deactivated, but a change of a PCell is considered a handover and needs a handover procedure. Currently, RLM is only on the PCell and thus RLF is only declared on the PCell, even though the UE makes measurements on SCells. The PCell, along with a PUCCH-SCell, are the only two cells that can carry PUCCH communication. RACH resources are only on the PCell. Dormancy applies only to SCells and not to PCells for a master cell group (MCG).

As indicated above, FIG. 6 is provided as an example. Other examples may differ from what is described with regard to FIG. 6.

Figure 7:
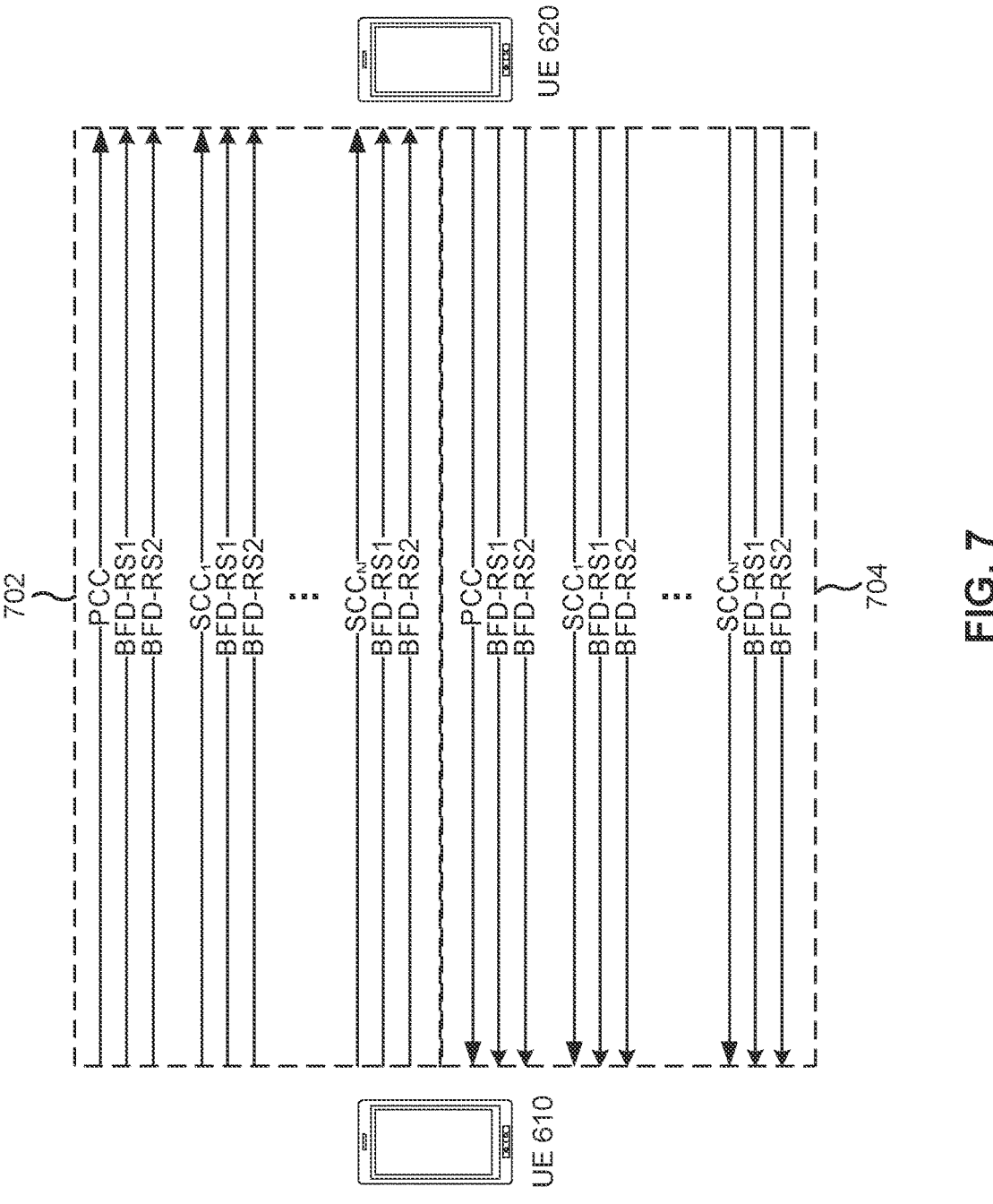
FIG. 7 is a diagram illustrating an example of beam failure detection for sidelink, in accordance with the present disclosure.

FIG. 7 is a diagram illustrating an example 700 of BFD for sidelink, in accordance with the present disclosure. Example 700 shows a pipe 702 in the direction of UE 610 to UE 620 and a pipe 704 in the direction of UE 620 to UE 610. Pipe 702 includes a PCC with a BFD-RS set of BFD-RSs, a first SCC with a BFD-RS set, up to an nth SCC with a BFD-RS set. In the opposite direction, pipe 704 includes a PCC with a BFD-RS set of BFD-RSs, a first SCC with a BFD-RS set, up to an n-th SCC with a BFD-RS set. Each BFD-RS set may be independent of another BFD-RS set.

According to various aspects described herein, a receiving UE (e.g., UE 620, MAC entity) may perform BFR for a PCC or a SCC in separate sidelinks and/or in separate directions. UE 620 may perform measurements on the BFD-RS set for PCC and/or the BFD-RS sets for respective SCCs. If all beams of a configured BFD-RS set for a CC have measurements below a specified threshold (e.g., minimum RSRP, minimum signal-to-noise ratio (SNR), minimum RSSI), the UE 620 may increment a beam failure instance counter (initially set to 0) associated with the CC. If the counter reaches a count threshold (e.g., maximum count), beam failure is declared. If a beam failure time expires before a beam is successful, beam failure is declared.

A UE (e.g. UE 610, UE 620) may perform BFR for different scenarios. In a first scenario, if beam failure is detected for the PCC and all SCCs, the UE may initiate a BFR (e.g., RACH procedure on the PCC). In a second scenario, if beam failure is detected on the PCC (and maybe on SCCs) but at least one SCC is available, the UE may initiate signaling through an SCC for a beam change. For example, the UE may transmit an aperiodic reference signal on the PCC and transmit a message on an SCC to measure the aperiodic reference signal. The reference signal may be aperiodic, rather than on a periodic time instance, to reduce latency as compared to existing BFR mechanisms that involve periodic reference signals. In a third scenario, if beam failure is detected on an SCC, the UE may trigger BFR for the serving cell. In this way, BFR may be per CC and per direction for a quicker beam recovery. As a result, the UE may reduce latency involved with BFD and BFR.

As indicated above, FIG. 7 is provided as an example. Other examples may differ from what is described with regard to FIG. 7.

Figure 8:
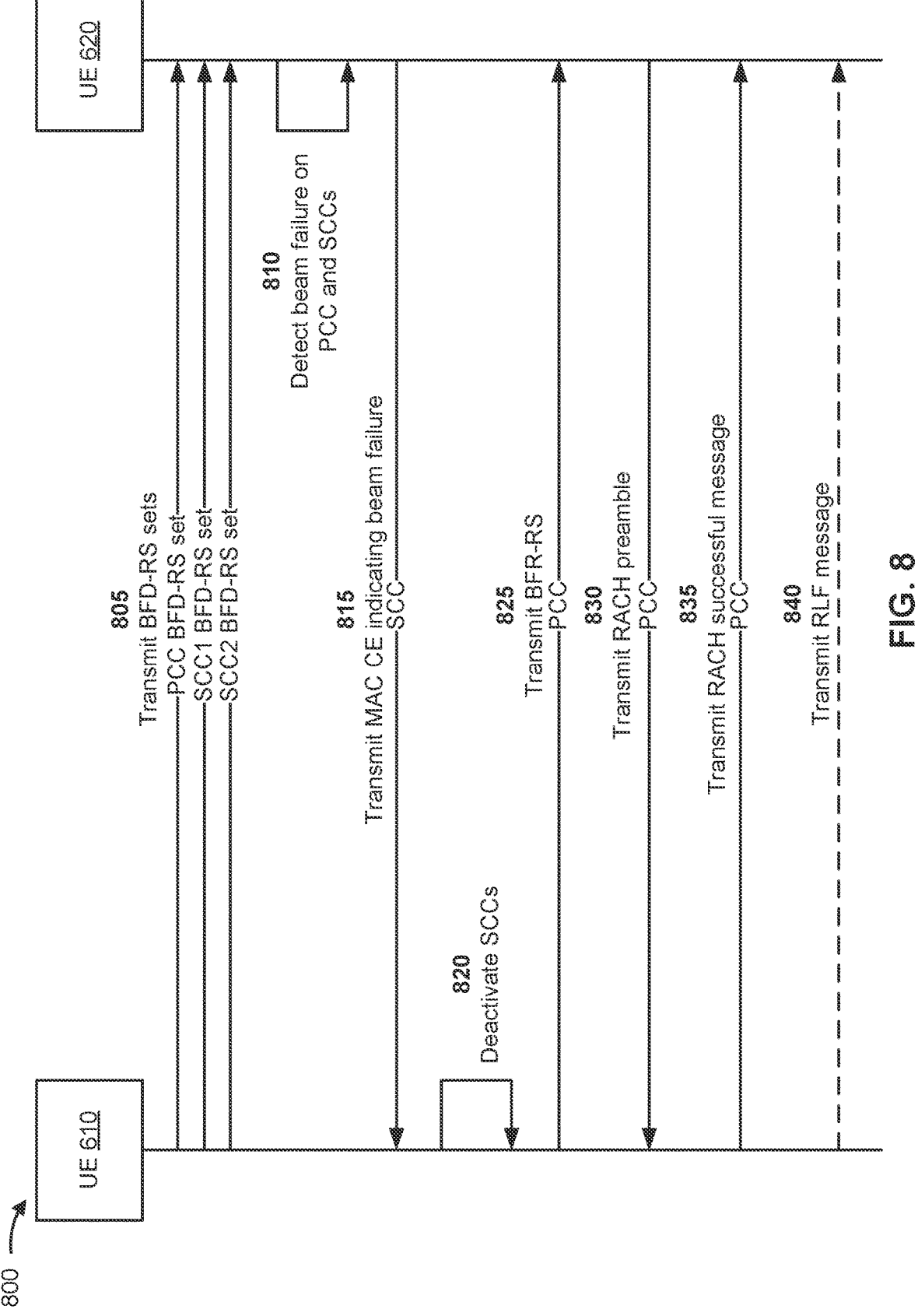
FIG. 8 is a diagram illustrating an example associated with a first scenario for sidelink beam failure recovery (BFR), in accordance with the present disclosure.

FIG. 8 is a diagram illustrating an example 800 associated with a first scenario for sidelink BFR, in accordance with the present disclosure.

Example 800 shows a first scenario when there is a beam failure on the PCC and all of the SCCs. Example 800 includes 2 SCCs (SCC1 and SCC2) in the direction from UE 610 to UE 620. As shown by reference number 805, UE 610 may transmit the BFD-RS sets on the PCC, on SCC1, and on SCC2. The PCC may be associated with a serving cell.

As shown by reference number 810, UE 620, being the receiving UE, may detect beam failure on the PCC and the SCCs (all of the SCCs). There is no SCC available. As shown by reference number 815, UE 620 may transmit a message (e.g., MAC CE) indicating a beam failure on the PCC and the SCCs (all of the SCCs). UE 620 may transmit the MAC CE on an SCC.

UE 610, receiving the MAC CE, may deactivate the SCCs, as shown by reference number 820. UE 610 may start a BFR recovery procedure. As shown by reference number 825, UE 610 may transmit a BFR-RS on the PCC. The BFR-RS may be aperiodic, or before a scheduled periodic instance for a BFR-RS. UE 620 may initiate a RACH procedure in response. As shown by reference number 830, UE 620 may transmit a RACH preamble. UE 610 may start a BFR timer and monitor the PSCCH for a random access response (RAR) using a sidelink radio network temporary identifier (RNTI). As shown by reference number 835, UE 610 may transmit a RACH successful message. If BFR is successfully completed, UE 610 may transmit a RACH successful message (e.g., RACH msg4). If the RACH procedure does not complete before expiration of the BFR timer, RLF is declared and UE 610 may transmit an RLF message, as shown by reference number 840.

By initiating a RACH procedure when the PCC and all of the SCCs have a beam failure, the UEs make perform a quick BFR, which reduces latency.

As indicated above, FIG. 8 is provided as an example. Other examples may differ from what is described with respect to FIG. 8.

Figure 9:
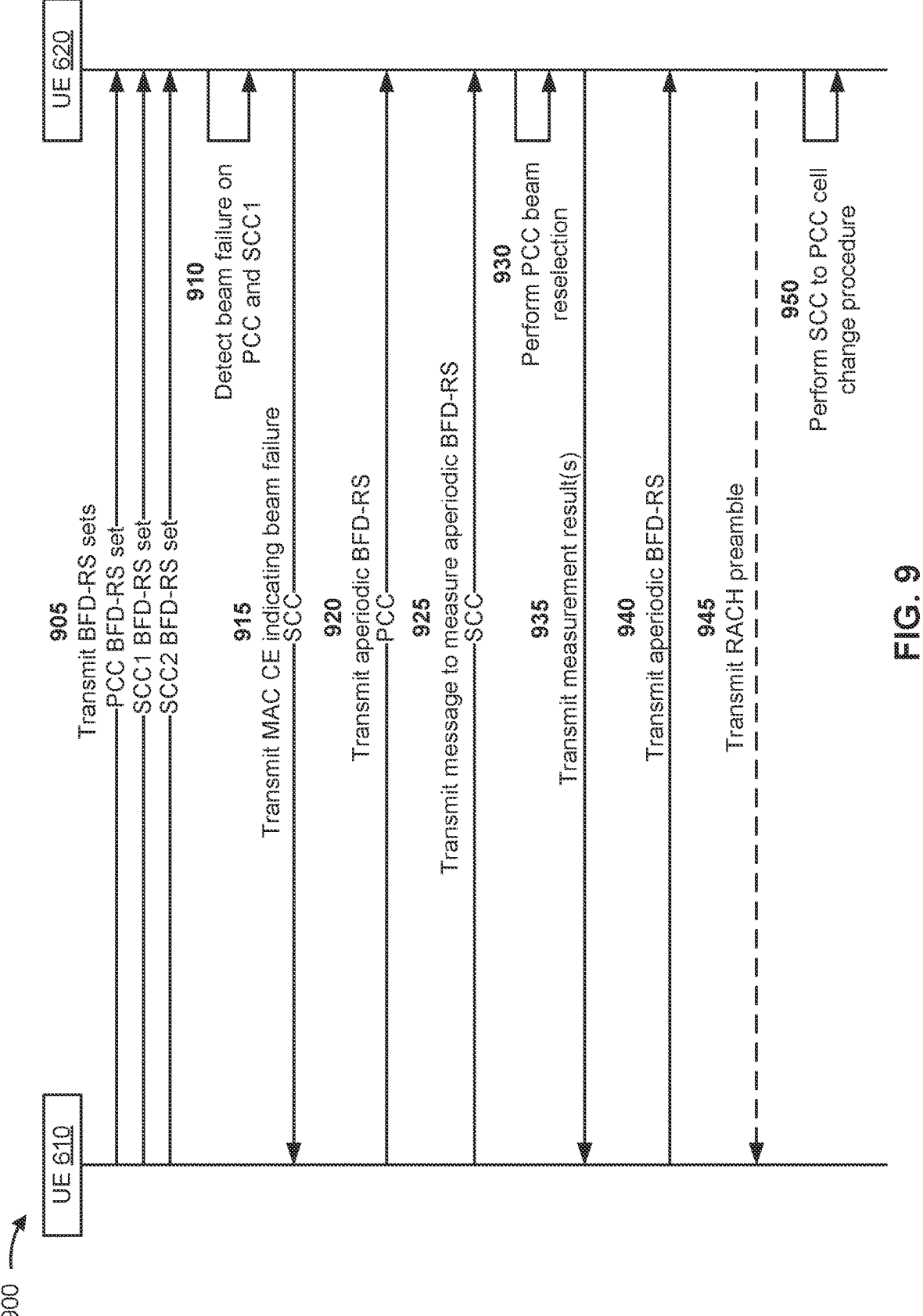
FIG. 9 is a diagram illustrating an example associated with a second scenario for sidelink BFR, in accordance with the present disclosure.

FIG. 9 is a diagram illustrating an example 900 associated with a second scenario for sidelink BFR, in accordance with the present disclosure.

Example 900 shows a second scenario when there is a beam failure on the PCC, but SCC1 and/or SCC2 may still be available. As shown by reference number 905, UE 610 may transmit the BFD-RS sets on the PCC, on SCC1, and on SCC2. As shown by reference number 910, UE 620 may detect beam failure on the PCC (and maybe on SCC1). SCC2 is still available. As shown by reference number 915, UE 620 may transmit a message (e.g., MAC CE) indicating a beam failure on the PCC and SCC1. UE 620 may transmit the MAC CE on an SCC.

UE 610 may start a BFR recovery procedure. As shown by reference number 920, UE 610 may transmit an aperiodic BFD-RS on the PCC. As shown by reference number 925, UE 610 may transmit a message to measure the aperiodic BFD-RS for faster BFR. As shown by reference number 930, UE 620 may perform PCC beam reselection to reselect to another beam of a beam set for the PCC. UE 620 may measure the aperiodic BFD-RS on the PCC.

In some aspects, UE 620 may perform a RACH procedure with the PCC. If this RACH procedure is unsuccessful, an SCC to PCC cell change can be triggered where the SCC can become the new PCC, conditional upon the availability of suitable SCC. UE 620 may measure BFD-RSs on one or more SCCs (e.g., available SCC2). As shown by reference number 935, UE 620 may transmit one or more measurement results. As shown by reference number 940, UE 610 may transmit a switch message (e.g., via MAC CE, SCI2) based at least in part on the one or more measurement results.

The switch message may indicate that the PCC is to switch to SCC2 (SCC2 becomes the PCC). The former PCC may become a possible SCC. UE 620 may reselect to SCC2 or another SCC based at least in part on the switch message, as a later part of the PCC beam reselection. The switch message may be a message to switch the serving cell to the new PCC.

In some aspects, if PCC beam reselection is not successful, UE 620 may perform a RACH procedure. This may include transmitting a RACH preamble, as shown by reference number 945. For a faster BFR RACH procedure, UE 610 my transmit an aperiodic BFD-RS. UE 610 may transmit a RAR. Beam refinement maybe performed after the RACH. A faster BFR reduces latency. If the RACH is unsuccessful, RLF may be declared on the PC5-RRC link.

In some aspects, as shown by reference number 950, the UE 620 may perform an SCC to PCC cell change procedure. For example, if the RACH is unsuccessful and an SCC is under good radio conditions, the cell of the SCC may become the primary cell. That is, the SCC can become the new PCC. If the cell change is unsuccessful, RLF may be declared on the PC5-RRC link.

As indicated above, FIG. 9 is provided as an example. Other examples may differ from what is described with respect to FIG. 9.

Figure 10:
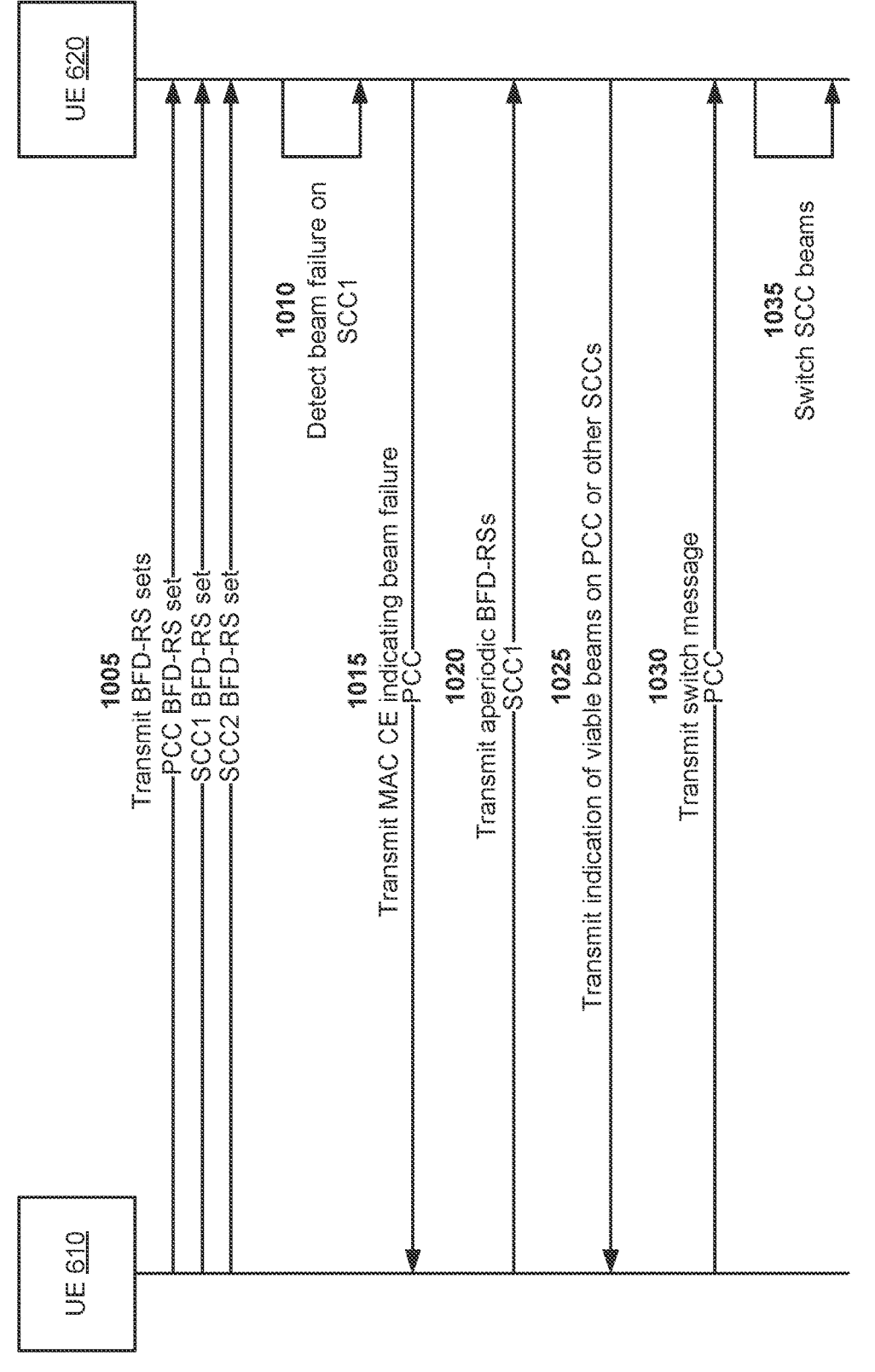
FIG. 10 is a diagram illustrating an example associated with a third scenario for sidelink BFR, in accordance with the present disclosure.

FIG. 10 is a diagram illustrating an example 1000 associated with a third scenario for sidelink BFR, in accordance with the present disclosure.

Example 1000 shows a third scenario when there is a beam failure on an SCC, such as on SCC1. As shown by reference number 1005, UE 610 may transmit the BFD-RS sets on the PCC, on SCC1, and on SCC2. As shown by reference number 1010, UE 620 may detect beam failure on SCC1. SCC2 is still available. As shown by reference number 1015, UE 620 may transmit a message (e.g., MAC CE) indicating a beam failure on SCC1. UE 620 may transmit the MAC CE on the PCC or another SCC.

UE 610 may start a BFR recovery procedure. As shown by reference number 1020, UE 610 may transmit an aperiodic BFD-RS on SCC1. UE 610 may transmit a message on the PCC to measure the aperiodic BFD-RS on SCC1. UE 610 may also transmit a trigger to indicate BFD-RS resources on the MAC. UE 620 may measure the aperiodic BFD-RSs.

As shown by reference number 1025, UE 620 may transmit an indication of one or more viable beams on the PCC or other SCCs (e.g., on SCC2), or whichever CCs do not have beam failure. As shown by reference number 1030, UE 610 may transmit a switch message (e.g., via a MAC CE, SCI2) based at least in part on the one or more measurement results. The switch message may indicate that UE 620 is to switch to a viable beam for the SCC1 or for SCC2. As shown by reference number 1035, UE 620 may switch to a viable beam.

As indicated above, FIG. 10 is provided as an example. Other examples may differ from what is described with respect to FIG. 10.

FIG. 11 is a diagram illustrating an example process 1100 performed, for example, by a UE, in accordance with the present disclosure. Example process 1100 is an example where the UE (e.g., UE 120, UE 610) performs operations associated with BFR for sidelink carrier aggregation.

As shown in FIG. 11, in some aspects, process 1100 may include transmitting reference signals on a primary sidelink carrier and on one or more secondary sidelink carriers using carrier aggregation (block 1110). For example, the UE (e.g., using communication manager 1408 and/or transmission component 1404 depicted in FIG. 14) may transmit reference signals on a primary sidelink carrier and on one or more secondary sidelink carriers using carrier aggregation, as described above, for example, with reference to FIGS. 6, 7, 8 and/or 9.

As further shown in FIG. 11, in some aspects, process 1100 may include receiving a MAC CE that indicates a beam failure on the primary sidelink carrier, the one or more secondary sidelink carriers, or both (block 1120). For example, the UE (e.g., using communication manager 1408 and/or reception component 1402 depicted in FIG. 14) may receive a MAC CE that indicates a beam failure on the primary sidelink carrier, the one or more secondary sidelink carriers, or both, as described above, for example, with reference to FIGS. 6, 7, 8 and/or 9.

As further shown in FIG. 11, in some aspects, process 1100 may include transmitting, in response to receiving the MAC CE, an aperiodic reference signal on the primary sidelink carrier (block 1130). For example, the UE (e.g., using communication manager 1408 and/or transmission component 1404 depicted in FIG. 14) may transmit, in response to receiving the MAC CE, an aperiodic reference signal on the primary sidelink carrier, as described above, for example, with reference to FIGS. 6, 7, 8 and/or 9.

Process 1100 may include additional aspects, such as any single aspect or any combination of aspects described below and/or in connection with one or more other processes described elsewhere herein.

In a first aspect, the MAC CE indicates the beam failure on the primary sidelink carrier and the one or more secondary sidelink carriers.

In a second aspect, alone or in combination with the first aspect, transmitting the reference signals includes transmitting a first set of reference signals on the primary sidelink carrier and a respective set of reference signals on each of the one or more secondary sidelink carriers.

In a third aspect, alone or in combination with one or more of the first and second aspects, receiving the MAC CE includes receiving the MAC CE on a secondary sidelink carrier of the one or more secondary sidelink carriers.

In a fourth aspect, alone or in combination with one or more of the first through third aspects, the beam failure recovery procedure is a RACH procedure, and wherein the method further comprises receiving a RACH preamble on the primary sidelink carrier.

In a fifth aspect, alone or in combination with one or more of the first through fourth aspects, process 1100 includes deactivating the one or more secondary sidelink carriers before receiving the RACH preamble.

In a sixth aspect, alone or in combination with one or more of the first through fifth aspects, the primary sidelink carrier is associated with a serving cell.

In a seventh aspect, alone or in combination with one or more of the first through sixth aspects, the beam failure includes the failure of all beams on the primary sidelink carrier and the one or more secondary sidelink carriers.

In an eighth aspect, alone or in combination with one or more of the first through seventh aspects, the MAC CE indicates a beam failure on the primary sidelink carrier.

In a ninth aspect, alone or in combination with one or more of the first through eighth aspects, process 1100 includes transmitting, on a secondary sidelink carrier of the one or more secondary sidelink carriers, a message to measure the aperiodic reference signal.

In a tenth aspect, alone or in combination with one or more of the first through ninth aspects, process 1100 includes receiving an aperiodic message indicating a measurement result of the aperiodic reference signal, and transmitting, based at least in part on the measurement result, a switch message to switch a serving cell from the primary sidelink carrier to a secondary sidelink carrier of the one or more secondary sidelink carriers.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

FIG. 12 is a diagram illustrating an example process 1200 performed, for example, by a UE, in accordance with the present disclosure. Example process 1200 is an example where the UE (e.g., UE 120, UE 610) performs operations associated with BFR for sidelink carrier aggregation.

As shown in FIG. 12, in some aspects, process 1200 may include transmitting reference signals on a primary sidelink carrier and on one or more secondary sidelink carriers using carrier aggregation (block 1210). For example, the UE (e.g., using communication manager 1408 and/or transmission component 1404 depicted in FIG. 14) may transmit reference signals on a primary sidelink carrier and on one or more secondary sidelink carriers using carrier aggregation, as described above, for example, with reference to FIGS. 6, 7, and/or 10.

As further shown in FIG. 12, in some aspects, process 1200 may include receiving a first MAC CE that indicates a failure of a beam on a secondary sidelink carrier of the one or more secondary sidelink carriers (block 1220). For example, the UE (e.g., using communication manager 1408 and/or reception component 1402 depicted in FIG. 14) may receive a first MAC CE that indicates a failure of a beam on a secondary sidelink carrier of the one or more secondary sidelink carriers, as described above, for example, with reference to FIGS. 6, 7, and/or 10.

As further shown in FIG. 12, in some aspects, process 1200 may include transmitting, in response to receiving the first MAC CE, one or more aperiodic reference signals on other secondary sidelink carriers of the one or more secondary sidelink carriers (block 1230). For example, the UE (e.g., using communication manager 1408 and/or transmission component 1404 depicted in FIG. 14) may transmit, in response to receiving the first MAC CE, one or more aperiodic reference signals on other secondary sidelink carriers of the one or more secondary sidelink carriers, as described above, for example, with reference to FIGS. 6, 7, and/or 10.

As further shown in FIG. 12, in some aspects, process 1200 may include receiving a message indicating one or more beams of the other secondary sidelink carriers that are viable (block 1240). For example, the UE (e.g., using communication manager 1408 and/or reception component 1402 depicted in FIG. 14) may receive a message indicating one or more beams of the other secondary sidelink carriers that are viable, as described above, for example, with reference to FIGS. 6, 7, and/or 10.

As further shown in FIG. 12, in some aspects, process 1200 may include transmitting, via a second MAC CE on the primary sidelink carrier, a beam switch message based at least in part on the one or more beams that are viable (block 1250). For example, the UE (e.g., using communication manager 1408 and/or transmission component 1404 depicted in FIG. 14) may transmit, via a second MAC CE on the primary sidelink carrier, a beam switch message based at least in part on the one or more beams that are viable, as described above, for example, with reference to FIGS. 6, 7, and/or 10.

Process 1200 may include additional aspects, such as any single aspect or any combination of aspects described below and/or in connection with one or more other processes described elsewhere herein.

In a first aspect, transmitting the reference signals includes transmitting a first set of reference signals on the primary sidelink carrier and a respective set of reference signals on each of the one or more secondary sidelink carriers.

In a second aspect, alone or in combination with the first aspect, process 1200 includes transmitting, on the primary sidelink carrier, a message to measure the one or more aperiodic reference signals.

Although FIG. 12 shows example blocks of process 1200, in some aspects, process 1200 may include additional blocks, fewer blocks, different blocks, or differently arranged blocks than those depicted in FIG. 12. Additionally, or alternatively, two or more of the blocks of process 1200 may be performed in parallel.

FIG. 13 is a diagram illustrating an example process 1300 performed, for example, by a UE, in accordance with the present disclosure. Example process 1300 is an example where the UE (e.g., UE 120, UE 620) performs operations associated with BFR for sidelink carrier aggregation.

As shown in FIG. 13, in some aspects, process 1300 may include receiving reference signals on a primary sidelink carrier and on one or more secondary sidelink carriers using carrier aggregation (block 1310). For example, the UE (e.g., using communication manager 1408 and/or reception component 1402 depicted in FIG. 14) may receive reference signals on a primary sidelink carrier and on one or more secondary sidelink carriers using carrier aggregation, as described above, for example, with reference to FIGS. 6, 7, 8, 9, and/or 10.

As further shown in FIG. 13, in some aspects, process 1300 may include detecting a beam failure based at least in part on measurement of the reference signals (block 1320). For example, the UE (e.g., using communication manager 1408 and/or BFD component 1412 depicted in FIG. 14) may detect a beam failure based at least in part on measurement of the reference signals, as described above, for example, with reference to FIGS. 6, 7, 8, 9, and/or 10.

As further shown in FIG. 13, in some aspects, process 1300 may include transmitting a first aperiodic MAC CE that indicates a failure of one or more beams on one or more of the primary sidelink carrier or the one or more secondary sidelink carriers (block 1330). For example, the UE (e.g., using communication manager 1408 and/or transmission component 1404 depicted in FIG. 14) may transmit a first aperiodic MAC CE that indicates a failure of one or more beams on one or more of the primary sidelink carrier or the one or more secondary sidelink carriers, as described above, for example, with reference to FIGS. 6, 7, 8, 9, and/or 10.

Process 1300 may include additional aspects, such as any single aspect or any combination of aspects described below and/or in connection with one or more other processes described elsewhere herein.

In a first aspect, the beam failure is on the primary sidelink carrier and the one or more secondary sidelink carriers.

In a second aspect, alone or in combination with the first aspect, process 1300 includes receiving an aperiodic reference signal for a BFR procedure, and performing the BFR procedure for the primary sidelink carrier, where the BFR procedure is a RACH procedure, and where process 1300 includes transmitting a RACH preamble on the primary sidelink carrier.

In a third aspect, alone or in combination with one or more of the first and second aspects, transmitting the first aperiodic MAC CE includes transmitting the first aperiodic MAC CE on a secondary sidelink carrier of the one or more secondary sidelink carriers.

In a fourth aspect, alone or in combination with one or more of the first through third aspects, detecting the beam failure includes detecting the beam failure based at least in part on an expiration of a beam failure count timer or detecting the beam failure based at least in part on a beam failure counter reaching a beam failure threshold for all beams.

In a fifth aspect, alone or in combination with one or more of the first through fourth aspects, receiving the reference signals includes receiving a first set of reference signals on the primary sidelink carrier and a set of reference signals on each of the one or more secondary sidelink carriers.

In a sixth aspect, alone or in combination with one or more of the first through fifth aspects, the beam failure is on a secondary sidelink carrier of the one or more secondary sidelink carriers.

In a seventh aspect, alone or in combination with one or more of the first through sixth aspects, process 1300 includes receiving an aperiodic reference signal on the secondary sidelink carrier, receiving, on the primary carrier, a message to measure the aperiodic reference signal, measuring the aperiodic reference signal, and transmitting the measurement result in a second aperiodic MAC CE on the secondary sidelink carrier.

In an eighth aspect, alone or in combination with one or more of the first through seventh aspects, process 1300 includes receiving a switch message to switch a serving cell, and switching the serving cell from beams of the primary sidelink carrier to beams of a secondary sidelink carrier of the one or more secondary sidelink carriers.

In a ninth aspect, alone or in combination with one or more of the first through eighth aspects, process 1300 includes transmitting a random access channel preamble on the primary sidelink carrier based at least in part on one or more of the measurement result, an unsuccessful beam reselection on the primary sidelink carrier, or an unsuccessful switch of a serving cell.

In a tenth aspect, alone or in combination with one or more of the first through ninth aspects, process 1300 includes receiving, on the primary sidelink carrier, a message to measure one or more aperiodic reference signals, receiving the one or more aperiodic reference signals on one or more other secondary sidelink carriers, selecting one or more beams, of the one or more other secondary sidelink carriers, that are viable based at least in part on measuring the one or more aperiodic reference signals, transmitting, on a secondary sidelink carrier of the one or more other secondary sidelink carriers, a message indicating the one or more beams that are viable, receiving, via a MAC CE, a beam switch message on the primary sidelink carrier, and switching to viable beams of a secondary sidelink carrier of the one or more other secondary sidelink carriers.

Although FIG. 13 shows example blocks of process 1300, in some aspects, process 1300 may include additional blocks, fewer blocks, different blocks, or differently arranged blocks than those depicted in FIG. 13. Additionally, or alternatively, two or more of the blocks of process 1300 may be performed in parallel.

Figure 14:
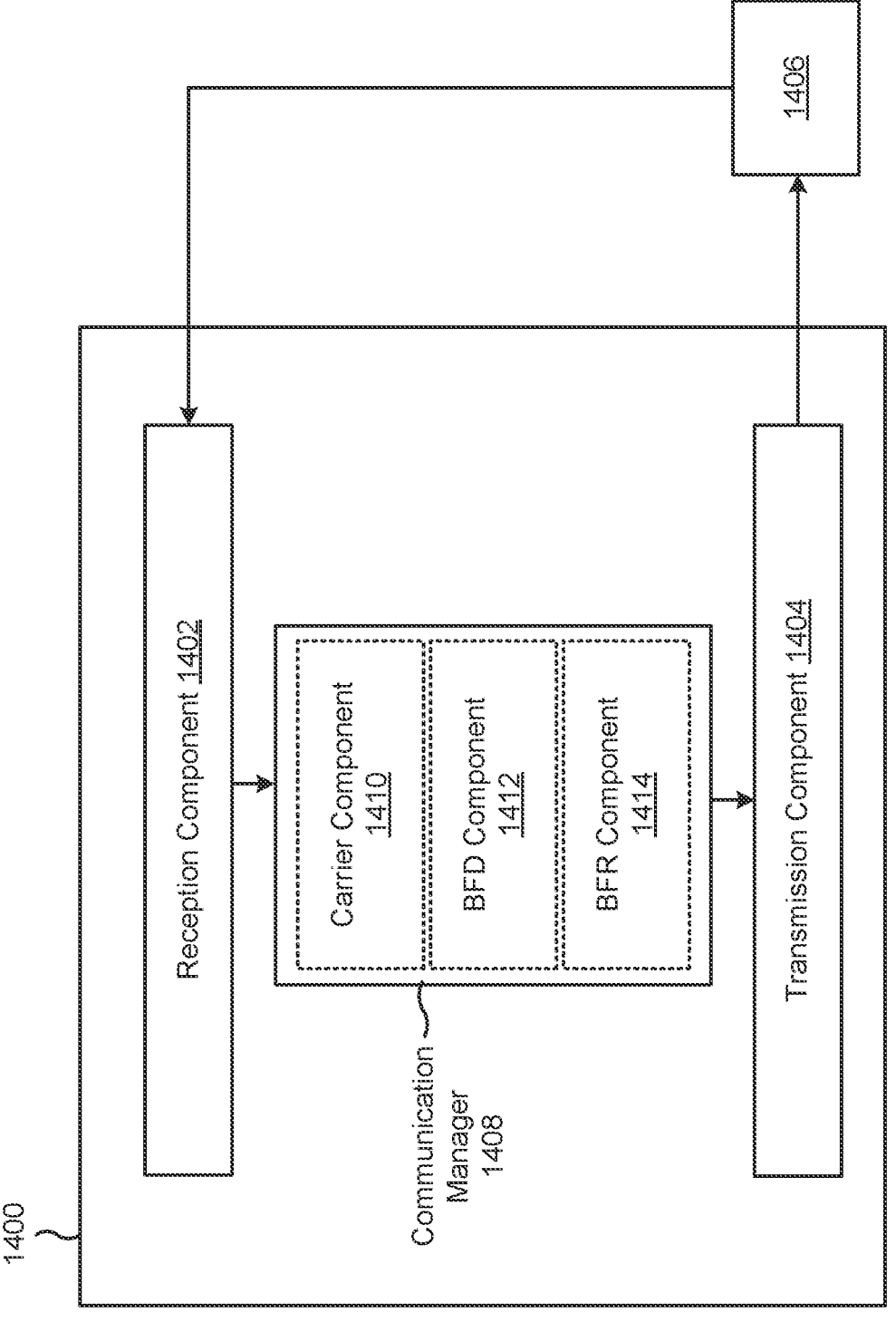
FIG. 14 is a diagram of an example apparatus for wireless communication, in accordance with the present disclosure.

FIG. 14 is a diagram of an example apparatus 1400 for wireless communication, in accordance with the present disclosure. The apparatus 1400 may be a UE (e.g., UE 120, UE 610, UE 620), or a UE may include the apparatus 1400. In some aspects, the apparatus 1400 includes a reception component 1402 and a transmission component 1404, which may be in communication with one another (for example, via one or more buses and/or one or more other components). As shown, the apparatus 1400 may communicate with another apparatus 1406 (such as a UE, a base station, or another wireless communication device) using the reception component 1402 and the transmission component 1404. As further shown, the apparatus 1400 may include the communication manager 1408. The communication manager 1408 may control and/or otherwise manage one or more operations of the reception component 1402 and/or the transmission component 1404. In some aspects, the communication manager 1408 may include one or more antennas, a modem, a controller/processor, a memory, or a combination thereof, of the UE described in connection with FIG. 2. The communication manager 1408 may be, or be similar to, the communication manager 140 depicted in FIGS. 1 and 2. For example, in some aspects, the communication manager 1408 may be configured to perform one or more of the functions described as being performed by the communication manager 140. In some aspects, the communication manager 1408 may include the reception component 1402 and/or the transmission component 1404. The communication manager 1408 may include one or more of a carrier component 1410, a BFD component 1412, and/or a BFR component 1414, among other examples.

In some aspects, the apparatus 1400 may be configured to perform one or more operations described herein in connection with FIGS. 1-10. Additionally, or alternatively, the apparatus 1400 may be configured to perform one or more processes described herein, such as process 1100 of FIG. 11, process 1200 of FIG. 12, process 1300 of FIG. 13, or a combination thereof. In some aspects, the apparatus 1400 and/or one or more components shown in FIG. 14 may include one or more components of the UE described in connection with FIG. 2. Additionally, or alternatively, one or more components shown in FIG. 14 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1402 may receive communications, such as reference signals, control information, data communications, or a combination thereof, from the apparatus 1406. The reception component 1402 may provide received communications to one or more other components of the apparatus 1400. In some aspects, the reception component 1402 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1400. In some aspects, the reception component 1402 may include one or more antennas, a modem, a demodulator, a MIMO detector, a receive processor, a controller/processor, a memory, or a combination thereof, of the UE described in connection with FIG. 2.

The transmission component 1404 may transmit communications, such as reference signals, control information, data communications, or a combination thereof, to the apparatus 1406. In some aspects, one or more other components of the apparatus 1400 may generate communications and may provide the generated communications to the transmission component 1404 for transmission to the apparatus 1406. In some aspects, the transmission component 1404 may perform signal processing on the generated communications (such as filtering, amplification, modulation, digital-to-analog conversion, multiplexing, interleaving, mapping, or encoding, among other examples), and may transmit the processed signals to the apparatus 1406. In some aspects, the transmission component 1404 may include one or more antennas, a modem, a modulator, a transmit MIMO processor, a transmit processor, a controller/processor, a memory, or a combination thereof, of the UE described in connection with FIG. 2. In some aspects, the transmission component 1404 may be co-located with the reception component 1402 in a transceiver.

In some aspects as a transmitting UE, the transmission component 1404 may transmit reference signals on a primary sidelink carrier and on one or more secondary sidelink carriers using carrier aggregation. The reception component 1402 may receive a MAC CE that indicates a beam failure on the primary sidelink carrier, the one or more secondary sidelink carriers, or both. The transmission component 1404 may transmit, in response to receiving the MAC CE, an aperiodic reference signal on the primary sidelink carrier.

The carrier component 1410 may deactivate the one or more secondary sidelink carriers before receiving the RACH preamble. The transmission component 1404 may transmit, on a secondary sidelink carrier of the one or more secondary sidelink carriers, a message to measure the aperiodic reference signal. The reception component 1402 may receive an aperiodic message indicating a measurement result of the aperiodic reference signal.

The transmission component 1404 may transmit, based at least in part on the measurement result, a switch message to switch a serving cell from the primary sidelink carrier to a secondary sidelink carrier of the one or more secondary sidelink carriers.

In some aspects, as a transmitting UE, the transmission component 1404 may transmit reference signals on a primary sidelink carrier and on one or more secondary sidelink carriers using carrier aggregation. The reception component 1402 may receive a first MAC CE that indicates a failure of a beam on a secondary sidelink carrier of the one or more secondary sidelink carriers. The transmission component 1404 may transmit, in response to receiving the first MAC CE, one or more aperiodic reference signals on other secondary sidelink carriers of the one or more secondary sidelink carriers. The reception component 1402 may receive a message indicating one or more beams of the other secondary sidelink carriers that are viable. The transmission component 1404 may transmit, via a second MAC CE on the primary sidelink carrier, a beam switch message based at least in part on the one or more beams that are viable. The transmission component 1404 may transmit, on the primary sidelink carrier, a message to measure the one or more aperiodic reference signals.

In some aspects as a receiving UE, the reception component 1402 may receive reference signals on a primary sidelink carrier and on one or more secondary sidelink carriers using carrier aggregation. The BFD component 1412 may detect a beam failure based at least in part on measurement of the reference signals. The transmission component 1404 may transmit a first aperiodic MAC CE that indicates a failure of one or more beams on one or more of the primary sidelink carrier or the one or more secondary sidelink carriers.

The reception component 1402 may receive an aperiodic reference signal for a beam failure recovery procedure. The BFR component 1414 may perform the beam failure recovery procedure for the primary sidelink carrier, where the beam failure recovery procedure is a RACH procedure, and the transmission component 1404 may transmit a RACH preamble on the primary sidelink carrier.

The reception component 1402 may receive an aperiodic reference signal on the secondary sidelink carrier. The reception component 1402 may receive, on the primary carrier, a message to measure the aperiodic reference signal. The BFR component 1414 may measure the aperiodic reference signal. The transmission component 1404 may transmit the measurement result in a second aperiodic MAC CE on the secondary sidelink carrier.

The reception component 1402 may receive a switch message to switch a serving cell. The carrier component 1410 may switch the serving cell from beams of the primary sidelink carrier to beams of a secondary sidelink carrier of the one or more secondary sidelink carriers.

The transmission component 1404 may transmit a RACH preamble on the primary sidelink carrier based at least in part on one or more of the measurement result, an unsuccessful beam reselection on the primary sidelink carrier, or an unsuccessful switch of a serving cell.

The reception component 1402 may receive, on the primary sidelink carrier, a message to measure one or more aperiodic reference signals. The reception component 1402 may receive the one or more aperiodic reference signals on one or more other secondary sidelink carriers.

The BFR component 1414 may select one or more beams, of the one or more other secondary sidelink carriers, that are viable based at least in part on measuring the one or more aperiodic reference signals. The transmission component 1404 may transmit, on a secondary sidelink carrier of the one or more other secondary sidelink carriers, a message indicating the one or more beams that are viable.

The reception component 1402 may receive, via a MAC CE, a beam switch message on the primary sidelink carrier. The carrier component 1410 may switch to viable beams of a secondary sidelink carrier of the one or more other secondary sidelink carriers.

The number and arrangement of components shown in FIG. 14 are provided as an example. In practice, there may be additional components, fewer components, different components, or differently arranged components than those shown in FIG. 14. Furthermore, two or more components shown in FIG. 14 may be implemented within a single component, or a single component shown in FIG. 14 may be implemented as multiple, distributed components. Additionally, or alternatively, a set of (one or more) components shown in FIG. 14 may perform one or more functions described as being performed by another set of components shown in FIG. 14.

The following provides an overview of some Aspects of the present disclosure:

Aspect 1: A method of wireless communication performed by a user equipment (UE), comprising: transmitting reference signals on a primary sidelink carrier and on one or more secondary sidelink carriers using carrier aggregation; receiving a medium access control element (MAC CE) that indicates a beam failure on the primary sidelink carrier, the one or more secondary sidelink carriers, or both; and transmitting, in response to receiving the MAC CE, an aperiodic reference signal on the primary sidelink carrier.

Aspect 2: The method of Aspect 1, wherein the MAC CE indicates the beam failure on the primary sidelink carrier and the one or more secondary sidelink carriers.

Aspect 3: The method of Aspect 2, wherein transmitting the reference signals includes transmitting a first set of reference signals on the primary sidelink carrier and a respective set of reference signals on each of the one or more secondary sidelink carriers.

Aspect 4: The method of Aspect 2 or 3, wherein receiving the MAC CE includes receiving the MAC CE on a secondary sidelink carrier of the one or more secondary sidelink carriers.

Aspect 5: The method of any of Aspects 2-4, wherein the one or more processors are configured to receive a random access channel (RACH) preamble on the primary sidelink carrier.

Aspect 6: The method of Aspect 5, further comprising deactivating the one or more secondary sidelink carriers before receiving the RACH preamble.

Aspect 7: The method of any of Aspects 2-6, wherein the primary sidelink carrier is associated with a serving cell.

Aspect 8: The method of any of Aspects 2-7, wherein the beam failure includes the failure of all beams on the primary sidelink carrier and the one or more secondary sidelink carriers.

Aspect 9: The method of Aspect 1, wherein the MAC CE indicates a beam failure on the primary sidelink carrier.

Aspect 10: The method of Aspect 9, further comprising transmitting, on a secondary sidelink carrier of the one or more secondary sidelink carriers, a message to measure the aperiodic reference signal.

Aspect 11: The method of Aspect 10, further comprising: receiving an aperiodic message indicating a measurement result of the aperiodic reference signal; and transmitting, based at least in part on the measurement result, a switch message to switch a serving cell from the primary sidelink carrier to a secondary sidelink carrier of the one or more secondary sidelink carriers.

Aspect 12: A method of wireless communication performed by a user equipment (UE), comprising: transmitting reference signals on a primary sidelink carrier and on one or more secondary sidelink carriers using carrier aggregation; receiving a first medium access control element (MAC CE) that indicates a failure of a beam on a secondary sidelink carrier of the one or more secondary sidelink carriers; transmitting, in response to receiving the first MAC CE, one or more aperiodic reference signals on other secondary sidelink carriers of the one or more secondary sidelink carriers; receiving a message indicating one or more beams of the other secondary sidelink carriers that are viable; and transmitting, via a second MAC CE on the primary sidelink carrier, a beam switch message based at least in part on the one or more beams that are viable.

Aspect 13: The method of Aspect 12, wherein transmitting the reference signals includes transmitting a first set of reference signals on the primary sidelink carrier and a respective set of reference signals on each of the one or more secondary sidelink carriers.

Aspect 14: The method of Aspect 12 or 13, further comprising transmitting, on the primary sidelink carrier, a message to measure the one or more aperiodic reference signals.

Aspect 15: A method of wireless communication performed by a user equipment (UE), comprising: receiving reference signals on a primary sidelink carrier and on one or more secondary sidelink carriers using carrier aggregation; detecting a beam failure based at least in part on measurement of the reference signals; and transmitting a first aperiodic medium access control element (MAC CE) that indicates a failure of one or more beams on one or more of the primary sidelink carrier or the one or more secondary sidelink carriers.

Aspect 16: The method of Aspect 15, wherein the beam failure is on the primary sidelink carrier and the one or more secondary sidelink carriers.

Aspect 17: The method of Aspect 16, further comprising: receiving an aperiodic reference signal for a beam failure recovery procedure; and performing the beam failure recovery procedure for the primary sidelink carrier, wherein the beam failure recovery procedure is a random access channel (RACH) procedure, and wherein the method includes transmitting a RACH preamble on the primary sidelink carrier.

Aspect 18: The method of Aspect 15 or 16, wherein transmitting the first aperiodic MAC CE includes transmitting the first aperiodic MAC CE on a secondary sidelink carrier of the one or more secondary sidelink carriers.

Aspect 19: The method of any of Aspects 15-18, wherein detecting the beam failure includes detecting the beam failure based at least in part on an expiration of a beam failure count timer or detecting the beam failure based at least in part on a beam failure counter reaching a beam failure threshold for all beams.

Aspect 20: The method of any of Aspects 15-19, wherein receiving the reference signals includes receiving a first set of reference signals on the primary sidelink carrier and a set of reference signals on each of the one or more secondary sidelink carriers.

Aspect 21: The method of Aspect 15, wherein the beam failure is on a secondary sidelink carrier of the one or more secondary sidelink carriers.

Aspect 22: The method of Aspect 21, further comprising: receiving an aperiodic reference signal on the secondary sidelink carrier; receiving, on the primary carrier, a message to measure the aperiodic reference signal; measuring the aperiodic reference signal; and transmitting the measurement result in a second aperiodic MAC CE on the secondary sidelink carrier.

Aspect 23: The method of Aspect 22, further comprising: receiving a switch message to switch a serving cell; and switching the serving cell from beams of the primary sidelink carrier to beams of a secondary sidelink carrier of the one or more secondary sidelink carriers.

Aspect 24: The method of Aspect 22 or 23, further comprising transmitting a random access channel preamble on the primary sidelink carrier based at least in part on one or more of the measurement result, an unsuccessful beam reselection on the primary sidelink carrier, or an unsuccessful switch of a serving cell.

Aspect 25: The method of Aspect 15, further comprising: receiving, on the primary sidelink carrier, a message to measure one or more aperiodic reference signals; receiving the one or more aperiodic reference signals on one or more other secondary sidelink carriers; selecting one or more beams, of the one or more other secondary sidelink carriers, that are viable based at least in part on measuring the one or more aperiodic reference signals; transmitting, on a secondary sidelink carrier of the one or more other secondary sidelink carriers, a message indicating the one or more beams that are viable; receiving, via a MAC CE, a beam switch message on the primary sidelink carrier; and switching to viable beams of a secondary sidelink carrier of the one or more other secondary sidelink carriers.

Aspect 26: An apparatus for wireless communication at a device, comprising a processor; memory coupled with the processor; and instructions stored in the memory and executable by the processor to cause the apparatus to perform the method of one or more of Aspects 1-25.

Aspect 27: A device for wireless communication, comprising a memory and one or more processors coupled to the memory, the one or more processors configured to perform the method of one or more of Aspects 1-25.

Aspect 28: An apparatus for wireless communication, comprising at least one means for performing the method of one or more of Aspects 1-25.

Aspect 29: A non-transitory computer-readable medium storing code for wireless communication, the code comprising instructions executable by a processor to perform the method of one or more of Aspects 1-25.

Aspect 30: A non-transitory computer-readable medium storing a set of instructions for wireless communication, the set of instructions comprising one or more instructions that, when executed by one or more processors of a device, cause the device to perform the method of one or more of Aspects 1-25.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
   a memory;
   a transceiver; and
   one or more processors, coupled to the transceiver and the memory, configured to:
      transmit, via the transceiver, reference signals on a primary sidelink carrier and on one or more secondary sidelink carriers using carrier aggregation;
      receive, via the transceiver, a medium access control control element (MAC CE) that indicates a beam failure on the primary sidelink carrier and the one or more secondary sidelink carriers;
      transmit, via the transceiver and in response to receiving the MAC CE, an aperiodic reference signal on the primary sidelink carrier; and
      transmit, on a secondary sidelink carrier of the one or more secondary sidelink carriers, a message to measure the aperiodic reference signal.

2. The UE of claim 1, wherein the one or more processors, to transmit the reference signals, are configured to transmit a first set of reference signals on the primary sidelink carrier and a respective set of reference signals on each of the one or more secondary sidelink carriers.

3. The UE of claim 1, wherein the one or more processors, to receive the MAC CE, are configured to receive the MAC CE on a reverse direction secondary sidelink carrier.

4. The UE of claim 1, wherein the one or more processors are further configured to receive, via the transceiver, a random access channel (RACH) preamble on a reverse direction primary sidelink carrier.

5. The UE of claim 4, wherein the one or more processors are further configured to deactivate the one or more secondary sidelink carriers before receiving the RACH preamble.

6. The UE of claim 1, wherein the primary sidelink carrier is associated with a serving cell.

7. The UE of claim 1, wherein the beam failure includes the failure of all beams on the primary sidelink carrier and the one or more secondary sidelink carriers.

8. The UE of claim 1, wherein the one or more processors are configured to:

receive, via the transceiver, a measurement result of the aperiodic reference signal; and transmit, via the transceiver and based at least in part on the measurement result, a switch message to switch a serving cell from the primary sidelink carrier.

9. A user equipment (UE) for wireless communication, comprising:

a memory;

a transceiver; and one or more processors, coupled to the transceiver and the memory, configured to:

transmit, via the transceiver, reference signals on a primary sidelink carrier and on one or more secondary sidelink carriers using carrier aggregation;

receive, via the transceiver, a first medium access control control element (MAC CE) that indicates a failure of a beam on a secondary sidelink carrier of the one or more secondary sidelink carriers;

transmit, via the transceiver and in response to receiving the first MAC CE, an aperiodic reference signal on the secondary sidelink carrier of the one or more secondary sidelink carriers; and transmit, via the transceiver on the primary sidelink carrier, a message to measure the aperiodic reference signal.

10. The UE of claim 9, wherein the one or more processors, to transmit the reference signals, are configured to transmit a first set of reference signals on the primary sidelink carrier and a respective set of reference signals on each of the one or more secondary sidelink carriers.

11. The UE of claim 9, wherein the one or more processors are further configured to:

receive, via the transceiver, a message indicating one or more beams of the one or more secondary sidelink carriers that are viable; and transmit, via the transceiver using a second MAC CE on the primary sidelink carrier, a beam switch on the one or more beams that are viable.

12. A user equipment (UE) for wireless communication, comprising:

a memory;

a transceiver; and one or more processors, coupled to the transceiver and the memory, configured to:

receive, via the transceiver, reference signals on a primary sidelink carrier and on one or more secondary sidelink carriers using carrier aggregation;

detect a beam failure based at least in part on measurement of the reference signals; and transmit, via the transceiver, a first medium access control control element (MAC CE) that indicates a failure of one or more beams on one or more of the primary sidelink carrier or the one or more secondary sidelink carriers;

receive, via the transceiver, an aperiodic reference signal on the one or more of the primary sidelink carrier or the one or more secondary sidelink carriers; and receive, via the transceiver, a message to measure the aperiodic reference signal.

13. The UE of claim 12, wherein the beam failure is on the primary sidelink carrier and the one or more secondary sidelink carriers.

14. The UE of claim 13, wherein the one or more processors are further configured to:

receive, via the transceiver, the aperiodic reference signal for a beam failure recovery procedure; and perform the beam failure recovery procedure for the primary sidelink carrier, wherein the beam failure recovery procedure is a random access channel (RACH) procedure, and wherein the one or more processors are configured to transmit a RACH preamble on a forward direction primary sidelink carrier.

15. The UE of claim 12, wherein the one or more processors, to transmit the first MAC CE, are configured to transmit the first MAC CE on a forward direction secondary sidelink carrier.

16. The UE of claim 12, wherein the one or more processors, to detect the beam failure, are configured to detect the beam failure based at least in part on an expiration of a beam failure count timer or detecting the beam failure based at least in part on a beam failure counter reaching a beam failure threshold.

17. The UE of claim 12, wherein the one or more processors, to receive the reference signals, are configured to receive a first set of reference signals on the primary sidelink carrier and a set of reference signals on each of the one or more secondary sidelink carriers.

18. The UE of claim 12, wherein the beam failure is on a secondary sidelink carrier of the one or more secondary sidelink carriers.

19. The UE of claim 18, wherein the one or more processors are further configured to:

receive, via the transceiver, the aperiodic reference signal on a sidelink carrier of the one or more secondary sidelink carriers;

receive, via the transceiver on the primary sidelink carrier, a message to measure the aperiodic reference signal;

measure the aperiodic reference signal; and transmit, via the transceiver, the measurement result in a second MAC CE on a forward direction secondary sidelink carrier.

20. The UE of claim 19, wherein the one or more processors are further configured to:

receive, via the transceiver, a switch message to switch a serving cell; and switch the serving cell from beams of the primary sidelink carrier to beams of a secondary sidelink carrier of the one or more secondary sidelink carriers.

21. The UE of claim 19, wherein the one or more processors are further configured to transmit, via the transceiver, a random access channel preamble on a forward direction primary sidelink carrier based at least in part on one or more of the measurement result, an unsuccessful beam reselection on the primary sidelink carrier, or an unsuccessful switch of a serving cell.

22. The UE of claim 12, wherein the one or more processors are further configured to:

select one or more beams, of the one or more secondary sidelink carriers, that are viable based at least in part on measuring the aperiodic reference signal;

transmit, via the transceiver on a forward direction secondary sidelink carrier, a message indicating the one or more beams that are viable; and receive, via the transceiver using a second MAC CE, a beam switch message on the primary sidelink carrier.

23. A method of wireless communication performed by a user equipment (UE), comprising:

transmitting reference signals on a primary sidelink carrier and on one or more secondary sidelink carriers using carrier aggregation;

receiving a medium access control control element (MAC CE) that indicates a beam failure on the primary sidelink carrier and the one or more secondary sidelink carriers transmitting, in response to receiving the MAC CE, an aperiodic reference signal on the primary sidelink carrier; and transmitting, on a secondary sidelink carrier of the one or more secondary sidelink carriers, a message to measure the aperiodic reference signal.

24. The method of claim 23, wherein the method further comprises receiving the MAC CE on a reverse direction secondary sidelink.

25. The method of claim 23, further comprising:

receiving a measurement result of the aperiodic reference signal; and transmitting, based at least in part on the measurement result, a switch message to switch a serving cell from the primary sidelink carrier.

26. The method of claim 23, wherein the method further comprises receiving the MAC CE on a reverse direction secondary sidelink carrier.

27. The method of claim 23, wherein the method further comprises receiving a random access channel (RACH) preamble on a reverse direction primary sidelink carrier.

28. The method of claim 27, wherein the method further comprises deactivating the one or more secondary sidelink carriers before receiving the RACH preamble.

29. A method of wireless communication performed by a user equipment (UE), comprising:

transmitting reference signals on a primary sidelink carrier and on one or more secondary sidelink carriers using carrier aggregation;

receiving a first medium access control control element (MAC CE) that indicates a failure of a beam on a secondary sidelink carrier of the one or more secondary sidelink carriers;

transmitting, in response to receiving the first MAC CE, an aperiodic reference signal on the secondary sidelink carrier of the one or more secondary sidelink carriers;

transmitting, on the primary sidelink carrier, a message to measure the aperiodic reference signal;

receiving a message indicating one or more beams of the one or more secondary sidelink carriers that are viable; and transmitting, via a second MAC CE on the primary sidelink carrier, a beam switch message on the one or more beams that are viable.

30. The method of claim 29, wherein transmitting the reference signals includes transmitting a first set of reference signals on the primary sidelink carrier and a respective set of reference signals on each of the one or more secondary sidelink carriers.

31. The method of claim 29, wherein the method further comprises:

receiving a message indicating one or more beams of the other secondary sidelink carriers that are viable; and transmitting, via a second MAC CE on the primary sidelink carrier, a beam switch message on the one or more beams that are viable.

32. A method of wireless communication performed by a user equipment (UE), comprising:

receiving reference signals on a primary sidelink carrier and on one or more secondary sidelink carriers using carrier aggregation;

detecting a beam failure based at least in part on measurement of the reference signals; and transmitting a first medium access control control element (MAC CE) that indicates a failure of one or more beams on one or more of the primary sidelink carrier or the one or more secondary sidelink carriers;

receiving an aperiodic reference signal on the one or more of the primary sidelink carrier or the one or more secondary sidelink carriers; and receiving a message to measure the aperiodic reference signal.

33. The method of claim 32, wherein the beam failure is on the primary sidelink carrier and the one or more secondary sidelink carriers, and wherein the method includes:

receiving the aperiodic reference signal for a beam failure recovery procedure; and performing the beam failure recovery procedure for the primary sidelink carrier, wherein the beam failure recovery procedure is a random access channel (RACH) procedure, and wherein the method includes transmitting a RACH preamble on a forward direction primary sidelink carrier.

34. The method of claim 32, wherein transmitting the first MAC CE includes transmitting the first MAC CE on a forward direction secondary sidelink carrier.

35. The method of claim 32, wherein the beam failure is on a secondary sidelink carrier of the one or more secondary sidelink carriers, and wherein the method includes:

receiving the aperiodic reference signal on a sidelink carrier of the one or more secondary sidelink carriers;

receiving, on the primary sidelink carrier, the message to measure the aperiodic reference signal;

measuring the aperiodic reference signal; and transmitting the measurement result in a second aperiodic MAC CE on a forward direction secondary sidelink carrier.

36. The method of claim 32, further comprising:

selecting one or more beams, of the one or more secondary sidelink carriers, that are viable based at least in part on measuring the aperiodic reference signal;

transmitting, on a forward direction secondary sidelink carrier, a message indicating the one or more beams that are viable; and receiving, via a second MAC CE, a beam switch message on the primary sidelink carrier.

37. The method of claim 32, wherein the detecting the beam failure further comprises:

detecting the beam failure based at least in part on an expiration of a beam failure count timer; or detecting the beam failure based at least in part on a beam failure counter reaching a beam failure threshold.

38. An apparatus for wireless communication, comprising:

means for transmitting reference signals on a primary sidelink carrier and on one or more secondary sidelink carriers using carrier aggregation;

means for receiving a medium access control control element (MAC CE) that indicates a beam failure on the primary sidelink carrier and the one or more secondary sidelink carriers;

means for transmitting, in response to receiving the MAC CE, an aperiodic reference signal on the primary sidelink carrier; and means for transmitting, on a secondary sidelink carrier of the one or more secondary sidelink carriers, a message to measure the aperiodic reference signal.

39. An apparatus for wireless communication, comprising:

means for transmitting reference signals on a primary sidelink carrier and on one or more secondary sidelink carriers using carrier aggregation;

means for receiving a first medium access control control element (MAC CE) that indicates a failure of a beam on a secondary sidelink carrier of the one or more secondary sidelink carriers;

means for transmitting, in response to receiving the first MAC CE, an aperiodic reference signal on the secondary sidelink carrier of the one or more secondary sidelink carriers; and means for transmitting, on the primary sidelink carrier, a message to measure the aperiodic reference signal.

40. An apparatus for wireless communication, comprising:

means for receiving reference signals on a primary sidelink carrier and on one or more secondary sidelink carriers using carrier aggregation;

means for detecting a beam failure based at least in part on measurement of the reference signals;

means for transmitting a first aperiodic medium access control control element (MAC CE) that indicates a failure of one or more beams on one or more of the primary sidelink carrier or the one or more secondary sidelink carriers;

means for receiving an aperiodic reference signal on the one or more of the primary sidelink carrier or the one or more secondary sidelink carriers; and means for receiving a message to measure the aperiodic reference signal.

\* \* \* \* \*